United States Patent
Komatsu et al.

(10) Patent No.: US 6,784,131 B2
(45) Date of Patent: Aug. 31, 2004

(54) SILICON NITRIDE WEAR RESISTANT MEMBER AND METHOD OF MANUFACTURING THE MEMBER

(75) Inventors: Michiyasu Komatsu, Yokohama (JP); Hiroki Tonai, Yokohama (JP); Hiroshi Komorita, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 251 days.

(21) Appl. No.: 10/042,254

(22) Filed: Jan. 11, 2002

(65) Prior Publication Data

US 2002/0136908 A1 Sep. 26, 2002

(30) Foreign Application Priority Data

Jan. 12, 2001 (JP) .................................... P2001-005010
Feb. 27, 2001 (JP) .................................... P2001-052653
Dec. 28, 2001 (JP) .................................... P2001-399360

(51) Int. Cl.$^7$ ........................ C04B 35/587; F16C 33/30
(52) U.S. Cl. .................... 501/97.1; 501/97.2; 501/97.3; 384/492; 384/907.1
(58) Field of Search .............................. 501/97.1, 97.2, 501/97.3, 97.4; 384/492, 907.1

(56) References Cited

U.S. PATENT DOCUMENTS 5,776,600 A * 7/1998 Katayama et al. ......... 428/325
6,242,374 B1 * 6/2001 Komatsu .................... 501/97.2
6,541,406 B1 * 4/2003 Araki et al. ................ 501/97.2
6,613,443 B2 * 9/2003 Komatsu et al. ............ 428/469
6,642,165 B2 * 11/2003 Miyashita et al. ......... 501/97.4

FOREIGN PATENT DOCUMENTS

| JP | 63-319263 | 12/1988 |
|----|-----------|---------|
| JP | 1-230478 | 9/1989 |
| JP | 11-49571 | 2/1999 |

* cited by examiner

Primary Examiner—Karl Group
(74) Attorney, Agent, or Firm—Oblon, Spivak, McClelland, Maier & Neustadt, P.C.

(57) ABSTRACT

The present invention provides a silicon nitride wear resistant member composed of silicon nitride sintered body containing 1–10 mass % of rare earth element in terms of oxide thereof as sintering agent, wherein a total oxygen content of the silicon nitride sintered body is 6 mass % or less, a porosity of the silicon nitride sintered body is 0.5 vol. % or less, and a maximum size of pore existing in grain boundary phase of the silicon nitride sintered body is 0.3 μm or less. According to the above structure of the present invention, there can be provided a silicon nitride wear resistant member and a method of manufacturing the member having a high strength and a toughness property, and particularly excellent in sliding characteristics.

18 Claims, 1 Drawing Sheet

THRUST-TYPE ROLLING ABRATION TESTING MACHINE

SILICON NITRIDE WEAR RESISTANT MEMBER AND METHOD OF MANUFACTURING THE MEMBER

BACKGROUND OF THE INVENTION

1. Technical Field of the Invention

The present invention relates to a wear resistant member mainly composed of silicon nitride and a method of manufacturing the member, and more particularly to a silicon nitride wear resistant member and a method of manufacturing the member capable of exhibiting excellent wear resistance, particularly rolling life characteristics when the wear resistant member is used as rolling bearing member, and is suitable as a material for constituting a rolling bearing member requiring an excellent durability.

2. Description of the Related Art

Wear resistant member (abrasion resistant member) has been applied to various fields such as, for example, bearing member, various roller members for rolling operation, compressor vane, gas-turbine blade, engine parts such as cam roller or the like. As a material for constituting the wear resistant member, various ceramic materials have been conventionally used. In particular, silicon nitride sintered body is excellent in mechanical strength and wear resistance property. For this reason, the silicon nitride sintered body has been applied to various technical fields.

Various sintering compositions for the silicon nitride sintered bodies are well known: such as silicon nitride/yttrium oxide/aluminum oxide system; silicon nitride/yttrium oxide/aluminum oxide/aluminum nitride system; and silicon nitride/yttrium oxide/aluminum oxide/titanium oxide system or the like. Sintering assistant agents composed of the oxides of rare earth elements, such as yttrium oxide ($Y_2O_3$) in the sintering compositions listed above, have a function of generating grain boundary phase (liquid phase) composed of Si-rare earth element-Al—O—N or the like during the sintering operation. Therefore, the sintering assistant agents are added to a material composition for enhancing the sintering characteristics of sintering materials, and achieve high density and high strength of the sintered bodies.

According to the conventional art, silicon nitride sintered bodies are generally mass-produced as follows. After a sintering assistant agent as mentioned above is added to the material powder of silicon nitride, the material mixture is molded to form a compact. Thus obtained compact is then sintered in a sintering furnace at about 1,650–1,900° C. for a predetermined period of time followed by naturally cooling (self-cooling) the resultant sintered body in the furnace at a high cooling rate.

Among the various applications to the wear resistant members using the above silicon nitride sintered body, the bearing member has been generally recognized to be useful material. Such bearing member has been used to various applications, and also started to be reviewed to use as an important protection safety parts. For this reason, the bearing member composed of silicon nitride sintered body i.e. rolling bodies such as ball and roller or the like has been required to further improve reliability.

For example, defects such as flaw and crack or the like formed on a surface of the rolling body will result to a breakage of not only the bearing member per se but also an entire system using the bearing member. Therefore, there is adopted a manufacturing process for excluding or eliminating such defects as completely as possible. In a similar way, a pore existing close to the surface of the rolling body would also be a cause of deteriorating the reliability of the bearing member, so that the pore is removed at a process when the member is worked into a product having a final shape.

Although the silicon nitride sintered body produced by the conventional method achieves an improved bending strength, fracture toughness and wear resistance, however, the improvement is insufficient. A durability as a rolling bearing member requiring a particularly excellent sliding property is insufficient, so that a further improvement has been demanded.

In these days, a demand of ceramic material as precision device members has increased. In these applications, advantages such as high hardness and light weight together with high corrosion resistance and low thermal expansion property of the ceramic are utilized. In particular, in view of the high-hardness and high wear resistance, application as a wear resistant member for constituting a sliding portion of the bearing or the like has been rapidly extended.

However, in a case where rolling balls of a bearing or the like were constituted by the wear resistant member composed of ceramic, when the rolling balls were rolled while being repeatedly contacted with counterpart at a high stress level, the rolling life of the wear resistant member was not sufficient yet. Therefore, a surface of the wear resistant member is peeled off and the member causes cracks, so that the defective member was liable to causes vibration and damage to a device equipped with the bearing. At any rate, there had been posed a problem that the durability and reliability as a material for constituting the parts of the device was low.

The silicon nitride sintered body produced by the conventional manufacturing method was inevitably formed with defects such as flaws and cracks at a stage after sintering operation, the defects were formed at portions not only the surface of the sintered body but also a deep portion so that the defects extend to a relatively inner portion of the sintered body. These defects lead to defective products, or even if the defects do not lead to the defective products, a manufacturing manpower for obtaining a surface having a high reliability by removing the cracks or the like i.e. a manpower required for a process of a surface grinding operation till the cracks or the like were substantially eliminated was disadvantageously increased, thus leads to an increase of the manufacturing cost of the rolling bodies.

That is, when a silicon nitride molded body is sintered, a part of impurity oxygen contained in the silicon nitride powder (material powder) and a part of oxygen contained in the sintering assistant agent are evaporated thereby to generate a gas component. The gas component is simultaneously generated at an almost the same time when the silicon nitride molded body starts to shrink at the sintering operation. In ordinary sintering method, since a densification starts at a surface portion of the sintered body in accordance with the start of the shrinkage of the molded body, it is difficult to remove the gas component contained in the inner portion of the sintered body.

When the above gas component remains in the sintered body, pores are formed in the silicon nitride sintered body, and oxygen is combined with Si thereby to remain as $SiO_2$. In the conventional manufacturing method, since the gas component could not be sufficiently removed, the pores and $SiO_2$ resulting from the gas component remain in a relatively broad region, and these pores and $SiO_2$ caused a crack or the like extending towards inner portion of the sintered body. In order to remove the cracks, it was required to remove the surface of the sintered body to some depth extent, so that these removal operations invites the occurrence of defects and an increase of the manufacturing cost of the sintered body.

Further, for example, when the sintered body is subjected to HIP treatment thereby to fill the pores with a liquid phase formed by the sintering assistant agent, the resultant silicon nitride sintered body can be highly densified. However, a segregation of the liquid phase component are disadvantageously formed to a portion where the pores were existing. The liquid phase components have strength and hardness lower than those of silicon nitride crystal grains, so that the segregation of the liquid phase component becomes a starting point of a breakage when the silicon nitride sintered body is used as the wear resistant member. Accordingly, such an aggregated substance is also required to be removed.

At any rate, in the conventional method of manufacturing the silicon nitride sintered body, there has been posed a problem that pores, cracks, segregations of liquid phase resulting from the gas component are unavoidably distributed to some depth extent of the sintered body. These defects would lead to defective product and also lead to an increase of working margin (a depth to be removed by working) of the surface of sintered body for the purpose of obtaining a good surface capable of increasing the reliability of the rolling body. These factors would increase the manufacturing cost of the wear resistant members such as rolling body or the like.

SUMMARY OF THE INVENTION

The present invention had been achieved for solving the aforementioned problems. Accordingly, an object of the present invention is to provide a wear resistant member and a method of manufacturing the member particularly excellent in sliding characteristics in addition to high strength property and high toughness property.

In particular, the object of the present invention is to provide a wear resistant member and a method of manufacturing the member capable of easily removing the gas component to be a cause of increasing defects and manufacturing cost, and capable of reducing the manufacturing cost in addition to realize various characteristics required for the wear resistant member.

In order to attain the objects described above, the inventors of the present invention had studied the effects and influences of the types of silicon nitride powder, sintering assistant agent and additives, the amounts thereof, and the sintering conditions on the characteristics of the final products, that is, the sintered bodies, by performing experiments.

As a result, the experiments provided the following findings. That is, a wear resistant member composed of a silicon nitride sintered body having a particularly excellent rolling life of sliding property could be obtained in addition to high strength property and a high toughness property: when certain amounts of a rare earth element, alumina, if necessary, magnesia, aluminum nitride, titan oxide or the like were added to a fine material powder of silicon nitride to prepare a material mixture; followed by molding the material mixture to form a molded compact (molded body) and degreasing the compact, and the compact was subjected to a deoxidization treatment (reduction of oxygen content) by holding the compact under a predetermined conditions on the way to sintering step, followed by subjecting a main sintering operation; or when the sintered body after completion of the sintering operation was subjected to a hot isostatic pressing (HIP) treatment under predetermined conditions.

Further, when the sintered body after completion of the sintering operation was moderately cooled at a cooling rate of 100° C. per hour or lower within a temperature range from the above high sintering temperature to a temperature at which the liquid phase generated from rare earth element during the sintering operation solidifies, it was also confirmed that a pore size to be formed in the sintered body structure could be further minimized.

In addition, prior to attaining a temperature (1600 to 1850° C.) at which a final densification-sintering of the silicon nitride was started, when the molded compact was heated to a temperature to some extent and held the compact at such temperature for a predetermined period of time, so that gas components such as oxygen and $SiO_2$ contained in the sintered body could be migrated towards outside and discharged from the sintered body. In view of this fact, it was found that the oxygen content of an outer peripheral portion of the sintered body could be finally lowered. Namely, a content of gas component, which became a cause of allowing the pores and cracks to further invade into an inner portion of the sintered body, could be reduced.

The present invention had been achieved on the basis of the aforementioned findings.

That is, according to the present invention, there is provided a wear resistant member composed of silicon nitride sintered body containing 1 to 10 mass % of rare earth element in terms of oxide thereof as sintering agent, wherein a total oxygen content of said silicon nitride sintered body is 6 mass % or less, a porosity of said silicon nitride sintered body is 0.5 vol. % or less, and a maximum size of pore existing in grain boundary phase of the silicon nitride sintered body is 0.3 μm or less.

Further, in the above wear resistant member, it is preferable that the silicon nitride sintered body has a three point bending strength of 900 MPa or more and a fracture toughness of 6.5 MPa·m$^{1/2}$ or more, and a rolling life defined as a rotation number of steel balls rolling along a circular track formed on the wear resistant member formed of the silicon nitride sintered body until a surface of the silicon nitride wear resistant member peels off is 1×10$^8$ or more, when the rolling life is measured in such a manner that a circular track having a diameter of 40 mm is set on the wear resistant member, three rolling balls each having a diameter of 9.525 mm and composed of SUJ2 are provided on the circular track, and the rolling balls are rotated on the track at a rotation speed of 1200 rpm under a condition of being applied with a pressing load of 400 Kg.

Furthermore, in the above wear resistant member, it is preferable that the silicon nitride sintered body has a crash strength of 200 MPa or more and a fracture toughness of 6.5 MPa·m$^{1/2}$ or more, and a rolling fatigue life defined as a time until a surface of rolling balls composed of the silicon nitride wear resistant member rolling along a circular track formed on a steel plate peels off is 400 hours or more, when the rolling fatigue life is measured in such a manner that three rolling balls each having a diameter of 9.525 mm are formed from the silicon nitride wear resistant member, the three rolling balls are provided on the circular track having a diameter of 40 mm set on the steel plate formed of SUJ2, and the rolling balls are rotated at a rotation speed of 1200 rpm on the track under a condition of being applied with a pressing load so as to impart a maximum contact stress of 5.9 GPa to the balls.

In this regard, as a method of measuring the wear resistance (rolling fatigue life) in a case where the wear resistant member has a ball-shape, the present invention is specified by using a ball composed of the wear resistant member having a diameter of 9.525 mm (⅜ inch) as a standard basis. However, the wear resistant member of this invention is not limited to the ball having the above size.

For example, in a case where the size of ball is different from the diameter of 9.525 mm (⅜ inch), the wear resistance is measured after the maximum contact stress is changed in accordance with the size of the ball. In this case of changing the maximum contact stress, the maximum contact stress for the ball having a different-size can be calculated in proportional to the size of the ball by using a unit conversion formula of 1 Pa=1.02×10$^{-5}$ kgf/cm$^2$. Note, even if the size of the ball is different from the above standard size, the rolling fatigue life of 400 hours or more can be obtained as far as the balls are composed of the wear resistant member of the present invention.

Further, in the wear resistant member according to the present invention, it is preferable that the silicon nitride sintered body contains at most 5 mass % of at least one of aluminum and magnesium in terms of the amount of oxide thereof. Furthermore, it is also preferable that the silicon nitride sintered body contains at most 5 mass % of aluminum nitride. In addition, it is also preferable that the silicon nitride sintered body contains at most 5 mass % of at least one element selected from the group consisting of Ti, Hf, Zr, W, Mo, Ta, Nb and Cr in terms of oxide thereof.

Further, when the wear resistant member composed of above the silicon nitride sintered body is a rolling bearing member, the wear resistant member can particularly exhibit excellent sliding property and durability.

Further, in above the wear resistant member according to the present invention, it is preferable that the silicon nitride sintered body is mainly composed of silicon nitride and contains a little amount of oxygen, the silicon nitride sintered body comprises an outer peripheral portion having a lower oxygen content than that of a center portion, and a difference of the oxygen contents between the outer peripheral portion and the center portion is within a range of 0.2–2 mass %. Furthermore, it is also preferable that the silicon nitride sintered body has a Vickers' hardness of 1200 or more.

When the oxygen content (oxygen concentration) at outer peripheral portion of the silicon nitride sintered body is reduced to be low as described above, an inversion depth (penetration depth) of the defects such as pores and/or cracks can be decreased to be shallow. Therefore, the generation of defective product resulting from the defects can be effectively suppressed, and the cost and manpower required for the surface working the sintered body can be also reduced. In view of these facts, when the wear resistant members such as rolling body or the like are prepared from the silicon nitride sintered body, the manufacturing cost can be remarkably reduced.

Further, it is also preferable that a difference in content of metal contained as sintering agent in the outer peripheral portion and the center portion of the silicon nitride sintered body used in the present invention is 0.2 mass % or less. As described above, in the silicon nitride sintered body used in the present invention, a removal of unnecessary oxygen is realized while a distribution of other metal components is substantially the same as those of conventional sintered bodies, so that inherent characteristics (strength and sliding property) as silicon nitride sintered body are maintained to be unchanged.

In the silicon nitride sintered body used in the present invention, when the difference in the oxygen contents of the outer peripheral portion and the center portion is within the range of 0.2 to 2 mass %, above functions and effects can be obtained. However, when the oxygen content of an entire sintered body is excessively high, there may be a fear that inherent characteristics of the silicon nitride sintered body are deteriorated. Therefore, it is preferable to set the oxygen content of the entire sintered body to 6 mass % or less. At most 4.5 mass % is particularly preferable.

Further, in above the wear resistant member, it is preferable that the silicon nitride sintered body comprises an intermediate portion of which oxygen content is at most 1 mass % lower than that of the center portion. When such intermediate portion is provided to the sintered body, the gradient of the oxygen content can be further moderated, whereby a defect ratio of the member and the cost required for surface working can be further suppressed.

A method of manufacturing the wear resistant member according to the present invention preferably comprises the steps of: molding a material composition mainly composed of silicon nitride powder to form a molded compact; heating the compact obtained in above molding step to a temperature of 1,200–1,500° C. in a vacuum atmosphere of 0.01 Pa or less and holding the compact at the temperature of 1,200–1,500° C. for 1–10 hours thereby to conduct a vacuum treatment; and sintering the compact subjected to the vacuum treatment at a temperature range of 1,600–1,800° C. in nitrogen gas atmosphere thereby to form a wear resistant member composed of silicon nitride sintered body.

The wear resistant member according to the present invention is characterized by being composed of the silicon nitride sintered body as prepared above, and is effective to bearing members such as bearing ball or the like. In particularly, the wear resistant member is effective to a large bearing ball having a diameter of 9 mm or more.

As a preferable embodiment of the present invention, the silicon nitride sintered body is mainly composed of silicon nitride and contains a little amount of oxygen, and the silicon nitride sintered body comprises an outer peripheral portion having an oxygen content lower than that of a center portion, and a difference of the oxygen contents between the outer peripheral portion and the center portion is within a range of 0.2–2 mass %. That is, the outer peripheral portion is constituted as a low-oxygen-content region of which oxygen content is reduced to be 0.2–2 mass % lower than that of the center portion of the silicon nitride sintered body.

Figure 2:
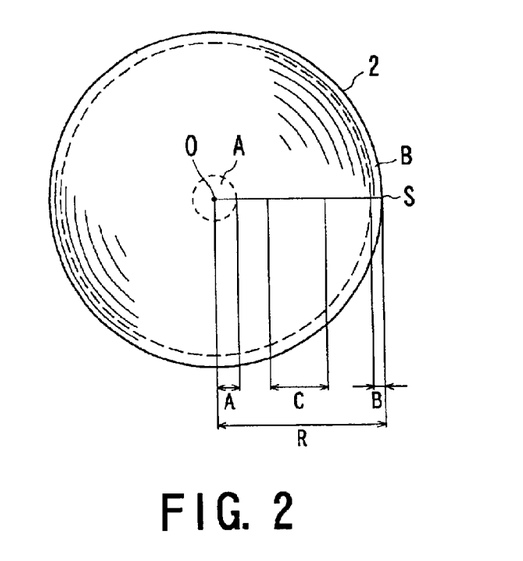
FIG. 2 is a view schematically showing respective regions each having a different oxygen content in the silicon nitride sintered body constituting a wear resistant member according to one embodiment of the present invention.

FIG. 2 is a view schematically showing respective regions each having a different oxygen content in the silicon nitride sintered body used in the present invention. Note, FIG. 2 exemplarily shows a silicon nitride sintered body 2 having a ball-shape as one example, and the present invention is not limited thereto. In the present invention, a region ranging from a center O of the silicon nitride sintered body 2 to a potion apart from the center O at a distance of 5% of radius R is defined as a center portion A. While, a region ranging from an outer surface S of the silicon nitride sintered body 2 to a potion apart from the outer surface S at a distance of 1% of radius R is defined as an outer peripheral portion B. In other words, the outer peripheral portion B is defined as a region ranging from a point apart from center O at a distance of 99% of the radius R to a point apart from center O at a distance of 100% of the radius R. In this connection, when the wear resistant member has a plate-shape, the respective regions are defined on the basis of a thickness of the member in place of the radius.

Assuming that the oxygen content of the center portion A of the above silicon nitride sintered body is $C_1$ mass % and the oxygen content of the outer peripheral portion B is $C_2$ mass %, the oxygen content $C_2$ of the outer peripheral portion B falls within a range of $(C_1-2)$ to $(C_1-0.2)$. Therefore, the oxygen contents satisfy a relation of $(C_1-2) \leq C_2 \leq (C_1-0.2) < C_1$.

The difference in the oxygen contents (difference in content of 0.2 mass % or more) between the center portion A and the outer peripheral portion B can be achieved by a manufacturing method of the present invention as described in detail later on. That is, above the different content distribution is achieved through a method comprising the steps of: heating a molded compact of silicon nitride powder to a temperature to some extent prior to attaining a temperature at which a final densification-sintering of the silicon nitride was started; and performing a step of holding the compact at such temperature for a predetermined period of time, so that gas components such as oxygen and $SiO_2$ contained in the sintered body are migrated towards outside and discharged from the sintered body.

The formation of the low-oxygen-content region to the outer peripheral portion B of the silicon nitride sintered body means that a residual oxygen content in the outer peripheral portion B and an amount of $SiO_2$ to be generated by combining oxygen with Si are small. Accordingly, an inversion depth (penetration depth) of the defects such as pores and/or cracks resulting from the gas components such as oxygen and $SiO_2$ or the like can be decreased to be shallow. Therefore, the generation of defective product resulting from these defects can be effectively suppressed, and the cost and manpower required for the surface working the sintered body can be also reduced. In view of these facts, the manufacturing cost of the silicon nitride sintered body and the wear resistant member using the sintered body can be remarkably reduced.

In this connection, when the difference of the oxygen content $C_1$ of the center portion A and the oxygen content $C_2$ of the outer peripheral portion B is less than 0.2 mass %, effects as the low-oxygen-content region can not be imparted to the outer peripheral portion B. On the other hand, the oxygen content difference exceeding 2 mass % means that the oxygen content of the outer peripheral portion B is extremely reduced, so that there may be a fear that a densification of the outer peripheral portion B cannot be sufficiently advanced, whereby the strength and the wear resistance of the outer peripheral portion B are adversely lowered. In this regard, it is preferable to set the difference in the oxygen contents between the center portion A and the outer peripheral portion B to within a range 0.5 to 1.5 mass %.

Further, in the silicon nitride sintered body preferably used in the present invention, an oxygen content $C_3$ of an intermediate portion (region C in the silicon nitride sintered body shown in FIG. 1) between the center portion A and the outer peripheral portion B has a content difference of at most 1 mass % with respect to the oxygen content $C_1$ of the center portion A. As described above, the silicon nitride sintered body used in the present invention has a content gradient (concentration gradient) in which the oxygen content is gradually reduced from the center portion A towards the outer peripheral portion B. Due to this structure, a percent defective of the silicon nitride sintered body and the cost or manpower required for the surface working the sintered body can be further suppressed.

Furthermore, in the silicon nitride sintered body used in the present invention, it is preferable that a concrete oxygen content (total oxygen content) is 6 mass % or less as an average value in an entire sintered body. When the total oxygen content exceeds 6 mass %, there is a large fear of deteriorating the inherent characteristics of the silicon nitride sintered body. In addition, it is also preferable that a concrete oxygen content of the outer peripheral portion B is within a range of 3 to 4 mass % in view of suppressing the generation of defects such as pores and cracks resulting from the gas components such as oxygen and $SiO_2$ or the like. Further, in order to also decrease the invasion depth of the defects, the above range of the total oxygen content is effective. It is particularly preferable that the above oxygen content is at most 4.5 mass %.

Note, each of the above oxygen contents of the center portion A, the intermediate portion C and the outer peripheral portion B is measured in such a manner that three measuring points are arbitrarily selected from the respective regions, then an oxygen content at the respective measuring points is measured by means of EPMA (electron probe micro analyzer), and the measured values are averaged to represent the oxygen content of the respective portions. The total oxygen content in the sintered body is a value measured by means of an oxygen analyzer based on an inert gas fusion-infrared-ray absorption method.

By the way, the term "total oxygen content" specified in the present invention denotes a total amount in terms of wt % (mass %) of oxygen constituting the silicon nitride sintered body. Accordingly, when the oxygen exists in the silicon nitride sintered body as compounds such as metal oxide, oxidized nitride or the like, the total oxygen content is not an amount of the metal oxide (and oxidized nitride) but an amount of oxygen in the metal oxide (and the oxidized nitride).

In a preferable embodiment of the present invention, as described above, the silicon nitride sintered body is formed to provide a difference in the oxygen contents between the center portion A and the outer peripheral portion B, and to have a content gradient in entire sintered body. However, with respect to metal components other than oxygen in the compounds added as the sintering assistant agent, such metal components are uniformly distributed in the sintered body as in the same manner as the conventional sintered body, so that the content difference in the metal components between the center portion A and the outer peripheral portion B is set to 0.2 mass % or less.

As described above, in the silicon nitride sintered body used in the present invention, unnecessary oxygen is removed to the utmost, while the distribution of the metal components other than oxygen is set to the same as in the conventional sintered body. Therefore, a basic microstructure of the sintered body comprising silicon nitride crystal grains and grain boundary phases (glass phases) existing between the crystal grains is maintained as it is, so that the inherent characteristics such as strength, hardness, fracture toughness value, sliding property (rolling life characteristics) or the like of the silicon nitride sintered body are maintained as they are.

Regarding hardness required for the wear resistant member, it is preferable that the wear resistant member exhibits a hardness of 1200 or more in terms of Vickers' hardness (Hv). When the hardness of the silicon nitride sintered body is less than 1200 Hv, the wear resistance is remarkably lowered. In particular, it becomes impossible to sufficiently satisfy the sliding property (rolling life characteristic) required for the bearing balls. It is further preferable that the hardness of the silicon nitride sintered body is 1300 Hv or more.

A method of manufacturing the wear resistant member composed of silicon nitride sintered body of the present invention is characterized by comprising the steps of: preparing a material mixture by adding 1 to 10 mass % of a rare earth element in terms of the amount of an oxide thereof to a silicon nitride powder containing at most 1.5 mass % of oxygen and 75–97 mass % of α-phase type silicon nitride and having an average grain size of 1.0 µm or less; molding the material mixture to form a compact; degreasing the compact; heating and holding the compact at a temperature of 1,250–1,600° C. for a predetermined period of time on the way to a sintering step; and conducting a main sintering for the compact at a temperature of 1,650–1,850° C. thereby to form a wear resistant member composed of silicon nitride sintered body.

In the above method of manufacturing the wear resistant member, when the sintered body is moderately cooled at a cooling rate of at most 100° C. per hour until the sintering temperature is reduced to a point at which a liquid phase formed by the rare earth element during the sintering step solidifies, a size of the pore can be further reduced.

Further, in the above manufacturing method, it is preferable that at most 5 mass % of at least one of aluminum and magnesium in terms of the amount of oxide thereof is added to the silicon nitride powder. Furthermore, it is also preferable that at most 5 mass % of aluminum nitride is added to the silicon nitride powder. Still further, it is also preferable that at most 5 mass % of at least one element selected from the group consisting of Ti, Hf, Zr, W, Mo, Ta, Nb and Cr in terms of oxide is added to the silicon nitride powder.

Furthermore, it is also preferable that the method further comprises a step of conducting a hot isostatic pressing treatment (HIP) to the silicon nitride sintered body in non-oxidizing atmosphere of 300 atm or more at a temperature of 1,600–1,850° C. after completion of the sintering step.

According to the above manufacturing method, the silicon nitride sintered body constituting the wear resistant member is prepared in such a manner that the silicon nitride molded body is subjected to a holding operation under a predetermined conditions, followed by being subjected to a main sintering operation, so that the oxygen content of the sintered body is effectively decreased and the generation of pores resulting from the oxygen is suppressed whereby it becomes possible to finely minimize the maximum pore size.

Further, the pores that are liable to be starting points of fatigue breakage at the time of a stress being applied thereto are reduced, so that the wear resistant member excellent in fatigue life and durability can be obtained.

Furthermore, even if a deoxidizing function is advanced due to the holding operation, the sintering property is improved thereby to reduce the pores, so that there can be provided a silicon nitride wear resistant member in which the total oxygen content is at most 6 mass %, preferably at most 4.5 mass %, grain boundaries containing rare earth element or the like are formed in the silicon nitride crystal structure, the maximum size of the pores existing in the grain boundary phase is 0.3 µm or less, porosity is 0.5 vol. %, three point bending strength at room temperature is 900 MPa or more, fracture toughness of 6.5 MPa·m$^{1/2}$ or more and crush strength is 200 MPa or more, and having an excellent mechanical properties.

To achieve good sintering characteristic, high bending strength, high fracture toughness value and long rolling life of the product, the silicon nitride fine powder which is used in the method of the invention and contained as a main component in the sintered body constituting the ceramic substrate of the invention preferably contains at most 1.5 mass %, preferably, 0.5–1.2 mass % of oxygen and 75–97 mass %, more preferably, 80–95 mass % of alpha-phase type silicon nitride, and, further the powder has fine grains, that is, an average grain size of at most 1.0 µm, more preferably about 0.4–0.8 µm.

When the silicon nitride powder having an impurity oxygen content exceeding 1.5 mass % is used, although the oxygen content difference between the center portion and the outer peripheral portion is increased, the oxygen content of entire sintered body and porosity are also increased, so that the strength of the silicon nitride sintered body is liable to lower. In other words, even if the silicon nitride powder contains an impurity oxygen at an amount up to 1.5 mass %, the present invention can provide sufficient effects. Therefore, it is not always necessary to use silicon nitride powder having a high purity. Also in view of this advantage, a cost-down can be realized. The more preferable oxygen content of the silicon nitride material powder is within a range of 0.5 to 1.2 mass %.

In this connection, as the silicon nitride material powder, two types of α-phase type $Si_3N_4$ powder and β-phase type $Si_3N_4$ powder have been known. However, when a sintered body is formed from the α-phase type $Si_3N_4$ powder, there is a tendency that a strength is liable to be insufficient. In contrast, in case of the β-phase type $Si_3N_4$ powder, although a high temperature is required for the sintering operation, there can be obtained a sintered body having a high strength and a structure in which a number of silicon nitride fibers each having a large aspect ratio are tangled in a complicate manner. Therefore, in the present invention, it is preferable to sinter α-phase type $Si_3N_4$ material powder at a high temperature, and to convert into a sintered body mainly composed of β-phase type $Si_3N_4$ crystal grains.

A reason why a blending amount of α-phase type $Si_3N_4$ powder is limited to a range of 75–97 mass % (wt %) is as follows. That is, when the amount is set to a range of 75 mass % or more, a bending strength, fracture toughness and rolling life of the $Si_3N_4$ sintered body are greatly increased thereby to further improve the excellent characteristics of the silicon nitride. On the other hand, the amount is limited to at most 97 mass % in view of the sintering property. It is more preferable to set the range to 80–95 mass %. The range to 85–90 mass % is further more preferable.

As a result, in order to achieve a good sintering characteristic, high bending strength, high fracture toughness and long rolling life of the product, as a starting material powder of the silicon nitride, it is preferable to use the silicon nitride fine powder containing at most 1.5 mass %, preferably, 0.5–1.2 mass % of oxygen, and at least 90 mass % of alpha-phase type silicon nitride, and further the powder has fine grains, that is, an average grain size of at most 1.0 µm, more preferably about 0.4–0.8 µm.

In particular, the use of a fine powder of silicon nitride having an average grain size of 0.7 µm or less facilitates forming a dense sintered body having a porosity of at most 0.5% by volume without requiring a large amount of a sintering assistant agent. The porosity of the sintered body can be easily measured in accordance with a Archimedes' method.

A total oxygen content contained in the silicon nitride sintered body constituting the wear resistant member of the present invention is specified to 6 mass % or less. When the total oxygen content in the sintered body exceeds 6 mass %, a maximum size of the pore formed in the grain boundary phase is disadvantageously increased, and the pore is liable to be a starting point of a fatigue failure, thereby to lower the rolling (fatigue) life of the wear resistant member. A preferable range the total oxygen content is 4.5 mass % or less.

By the way, the term "total oxygen content of the sintered body" specified in the present invention denotes a total amount in terms of mass % of oxygen constituting the silicon nitride sintered body. Accordingly, when the oxygen exists in the silicon nitride sintered body as compounds such as metal oxide, oxidized nitride or the like, the total oxygen content is not an amount of the metal oxide (and oxidized nitride) but an amount of oxygen in the metal oxide (and the oxidized nitride).

The maximum pore size formed in the grain boundaries of the silicon nitride sintered body constituting the wear resistant member of the present invention is specified to 0.3 µm or less. When the maximum pore size exceeds 0.3 µm, the pore is liable to particularly be a starting point of a fatigue failure, thereby to lower the rolling (fatigue) life of the wear resistant member. A preferable range of the maximum pore size is 0.2 µm or less.

Examples of the rare earth element to be added as a sintering assistant agent to a silicon nitride powder are Y, Ho, Er, Yb, La, Sc, Pr, Ce, Nd, Dy, Sm and Gd. Such a rare earth element may be added to the silicon nitride powder in the form of an oxide thereof or a substance which is changed into an oxide thereof during the sintering process. Two or more kinds of such oxide or substance may be added to the silicon nitride powder. Such a sintering assistant agent reacts with the silicon nitride powder so as to form a liquid phase and thereby serves as a sintering promoter.

The amount of a sintering assistant agent to be added to the material powder is set to be within a range of from 1 to 10 mass % in terms of the amount of an oxide thereof. If the amount is less than 1 mass %, the sintered body fails to achieve a sufficiently high density and high strength. In particular, when an element which has a large atomic weight like lanthanoid is used as the rare earth element at above less amount, a sintered body having a relatively low strength and relatively low thermal conductivity is formed.

On the other hand, if the amount is more than 10 mass %, an excessively large portion of the grain boundary phase is formed, and the generation of pore is increased, thereby reducing the strength of the sintered body. For this reason, the amount of a sintering assistant agent is within the range described above. For the same reason described above, the more preferred range of the amount of a sintering assistant agent is 2 to 8 mass %.

In the present invention, at least one of oxides ($Al_2O_3$, MgO) of aluminum (Al) and magnesium (Mg) to be used as an optional addition component promotes a function of the above rare earth element as sintering promoter thereby to enable the sintered body to be densified at a low temperature range. In addition, aluminum oxide ($Al_2O_3$) and magnesium oxide (MgO) have a function of controlling a grain growth in the crystal structure of the sintered body thereby to increase the mechanical strengths such as bending strength and fracture toughness value of $Si_3N_4$ sintered body.

Therefore, at least one of the oxides ($Al_2O_3$, MgO) is added to the material powder at an amount of at most 5 mass %. If the addition amount of at least one of Al and Mg is less than 0.2 mass % in terms of an oxide thereof, the sintered body fails to achieve a sufficiently addition effect. On the other hand, if the amount is excessively large so as to exceed 5 mass %, the oxygen content of the sintered body is disadvantageously increased. For this reason, the addition amount is set to 5 mass % or less, and a preferable range of the amount of the oxide is set to 0.2–5 mass %, more preferably to 0.5–3 mass %.

Further, aluminum nitride (AlN) may also be added as an optional component at a predetermined amount. AlN has a function of suppressing an evaporation of the silicon nitride during the sintering process and further promoting the function of the above rare earth element as sintering assistant agent. Therefore, it is preferable to add AlN at amount of 5 mass % or less.

When the addition amount of AlN is less than 0.1 mass %, a sintering operation at higher temperature is required. On the other hand, when the addition amount is excessively large to exceed 5 mass %, an excessively large amount of grain boundary phase is formed or AlN begins to solid-dissolve into the silicon nitride thereby to disadvantageously increase the pores, and the porosity of the $Si_3N_4$ sintered body is also increased. For this reason, the addition amount of AlN is set to the range of 5 mass % or less. In particular, in order to secure good performances together with sintering property, strength and rolling life, it is preferable to set the addition amount of AlN to a range of 0.1–3 mass %.

Further, in the present invention, Ti, Hf, Zr, W, Mo, Nb and Cr may also be added as another optional components at a predetermined amount. These elements to be used as another addition component are added to the substrate as oxides, carbides, nitrides, suicides and borides thereof. These compounds promote the sintering assistant effect of the rare earth element, and promote dispersion thereof in the crystal structure so as to enhance the mechanical strength of the silicon nitride ($Si_3N_4$) sintered body. Among them, compounds of Ti and Mo are particularly preferred.

If the amount of these compounds contained is less than 0.1 mass %, the substrate fails to achieve a sufficiently addition effect. On the other hand, if the amount is excessively large so as to exceed 5 mass %, the mechanical strength and rolling life of the sintered body are disadvantageously lowered. For this reason, the preferred range of the amount of these compounds contained is at most 5 mass %. In particular, the amount is more preferably set to a range of 0.2–3 mass %.

The above compounds such as Ti and Mo or the like also serve as light blocking agents (light shielding agents). More specifically, they color the silicon nitride type ceramic sintered body black and thus provides it with an opacity.

Further, since the porosity of the sintered body has a great influence on the rolling life and strength of the wear resistant member, so that the sintered body is manufactured so as to provide the porosity of 0.5 vol. % or less. If the porosity exceeds 0.5% by volume, the pore to be a starting point of the fatigue failure is rapidly increased, thereby to lower the strength of the sintered body and shorten the rolling life of the wear resistant member.

To ensure that the porosity of the silicon nitride sintered body is limited to at most 0.5% by volume and a maximum size of the pore existing in the grain boundary phase formed in the silicon nitride crystal structure is 0.3 µm or less, and having a total oxygen content of 4.5, mass % or less and a predetermined rolling life when the a thrust-type rolling abrasion testing machine is used, it is important that a silicon nitride molded compact prepared from the above material is degreased, followed by holding the compact at a temperature of 1250–1600° C. for 0.5–10 hours on the way to a sintering step, followed by sintering the compact by normal-pressure-sintering method or pressured-sintering method at temperature of 1,650–1,850° C. for about 2–10 hours.

Furthermore, when the sintered body immediately after the sintering step is moderately cooled at a cooling rate of 100° C. per hour or slower, the size of the pore can be further minimized.

In particular, by holding the molded compact at a temperature of 1250–1600° C. for 0.5–10 hours on the way to a sintering step, an oxygen concentration in the generated liquid phase (grain boundary phase) is reduced thereby to rise a melting point of the liquid phase, so that the generation of bubble-shaped pore, which is caused when the liquid phase melts, can be suppressed. Simultaneously, the maximum size of the pore is minimized to be fine, so that it becomes possible to improve the rolling life of the sintered body.

Although the above holding operation of the compact on the way to the sintering step exhibits a remarkable effect when the compact is subjected to the treatment in vacuum atmosphere at temperature of 1350–1450° C., almost the same effect can be also obtained when the compact is subjected to the treatment in nitrogen atmosphere at temperature of 1500–1600° C.

In addition, when the sintered body is moderately cooled at the cooling rate of 100° C. per hour or slower in a temperature range from the sintering temperature to a temperature at which the liquid phase solidifies, the reduction of the oxygen concentration in the liquid phase is further promoted, so that there can be obtained a sintered body in which the rolling life is improved.

If the sintering temperature is lower than 1,650° C., the sintered body fails to achieve a sufficiently high density; more specifically, the porosity becomes greater than 0.5 vol %, thereby reducing both the mechanical strength and the rolling life of the sintered body to undesired levels. On the other hand, if the sintering temperature exceeds 1,850° C., the silicon nitride component per se becomes likely to evaporate or decompose. In particular, if pressured-sintering process is not performed but the sintering process is performed under the normal pressure, the decomposition and evaporation of the silicon nitride component may occur at about 1,800° C.

The rate of cooling a sintered body immediately upon completion of the sintering operation is an important control factor to achieve a reduction of the pore size and crystallization of the grain boundary phase. If the sintered body is rapidly cooled at a cooling rate higher than 100° C. per hour, the grain boundary phase of the sintered body structure becomes an amorphous phase (glass phase) and, therefore, the reduction of the oxygen content in the liquid phase formed in the sintered body becomes insufficient. Thereby, the rolling life characteristic of the sintered body is disadvantageously lowered.

The sufficiently broad temperature range in which the cooling rate must be precisely controlled is from a predetermined sintering temperature (1,650–1,850° C.) to the solidifying point of the liquid phase formed by the reaction of the sintering assistant agent as described above. The liquid phase solidifies at about 1,600–1,500° C. if the sintering assistant agent as described above is used.

By maintaining the cooling rate at 100° C. per hour or slower, preferably, 50° C. per hour or slower, more preferably, 25° C. per hour or slower, at least in a temperature range from the above sintering temperature to the solidifying point of the liquid phase, the total oxygen content of the sintered body is 6 mass % or less, the maximum size of the pore is 0.3 µm or less, and porosity becomes 0.5% or less, thus achieving a silicon nitride sintered body excellent in rolling life characteristics and durability. When the above moderate cooling operation is combined with the holding operation as described above, further effective results can be obtained.

A silicon nitride sintered body constituting the wear resistant member according to the present invention can be produced by, for example, the following processes. A material mixture is prepared by adding predetermined amount of a sintering assistant agent, a required additive, such as an organic binder, and a compound of Al, Mg, AlN, Ti or the like, to a fine powder of silicon nitride which has a predetermined fine average grain size and contains very small amount of oxygen. The material mixture is then molded into a compact having a predetermined shape. As a method of molding the material mixture, conventional molding methods such as single-axial pressing method, the die-pressing method or the doctor-blade method, rubber-pressing method, CIP (cold isostatic pressing) method or the like can be applied.

In a case where the molded compact is prepared through the above press-molding method, in order to particularly form a grain boundary hardly causing the pores, it is preferable to set the molding pressure for the material mixture to 120 MPa or more. When the molding pressure is less than 120 MPa, there are easily formed portions to which rare earth element to be a component mainly constituting the grain boundary is agglomerated, and the compact cannot be sufficiently densified, so that there is obtained a sintered body with many crack-formations.

Further, the above agglomerated portion of the grain boundary is liable to become a starting point of fatigue failure, thus lowering the life and durability of the wear resistant member. On the other hand, when the molding pressure is set to an excessively large value so as to exceed 200 MPa, a durability of the molding die is disadvantageously lowered, and it cannot be always said that the productivity is good. Therefore, the above molding pressure is preferably set to a range of 120–200 MPa.

After the above molding process, the molding compact is heated and maintained at 600–800° C. for 1–2 hours in a non-oxidizing atmosphere or at 400–500° C. for 1–2 hours in the air, thereby degreasing the compact, that is, thoroughly removing the organic binder component added in the material mixture preparing process:

Next, on the way to the step of sintering the degreased compact, a pressure in a sintering furnace is reduced thereby to conduct a vacuum treatment.

That is, the degreased compact is heated up to a temperature range of 1250–1600° C. in a vacuum of 0.01 Pa or less and then the compact is held the above temperature of 1250–1600° C. for 0.5–10 hours. By conducting such the vacuum treatment, the gas components such as oxygen and $SiO_2$ contained in the sintered body can migrated towards outside and discharged from the sintered body. In this connection, since the discharge of the gas components is firstly caused at outer peripheral portion of the sintered body, it becomes possible to finally reduce the oxygen content at the outer peripheral portion.

When the temperature for the vacuum treatment is less than 1250° C., the discharge of the gas components cannot be sufficiently advanced, so that there may be a fear that the oxygen content at the outer peripheral portion of the final sintered body cannot be sufficiently reduced. On the other hand, when the temperature for the vacuum treatment exceeds 1600° C., the temperature becomes substantially the same as that of main sintering operation. In this case, the densification is started from the outer peripheral portion at an early stage of the sintering operation, so that there may be a case where the removal of the gas components at an intermediate portion or the like cannot be performed.

The same disadvantages are raised with respect to also a holding time (retention time) of the sintered body at the vacuum treatment. Namely, when the holding time is outside the range as specified above, there may be also a fear that the discharge of the gas components is insufficient, or the discharge of the gas components is excessively advanced.

Next, after the above vacuum treatment (holding operation), the compact is then sintered by normal-pressure-sintering method or pressured-sintering method at a temperature of 1,650–1,850° C. in a sintering atmosphere of inert gas such as argon gas or nitrogen gas. As the pressured-sintering method, various press-sintering methods such as a pressurized-atmosphere sintering method, hot-pressing method, HIP (hot isostatic pressing) method or the like can be utilized.

Note, the above sintering step may be successively performed after the vacuum treatment step, or may be also performed in such a manner that the temperature of the sintering furnace is once lowered to a room temperature or a temperature close to the room temperature, then nitrogen gas or the like is introduced into the furnace, thereafter heating the compact up to the sintering temperature.

In addition, when the silicon nitride sintered body is further subjected to a hot isostatic pressing (HIP) treatment under a temperature condition of 1,600–1,850° C. in non-oxidizing atmosphere of 300 atm or higher, the influence of the pore constituting a starting point of fatigue failure of the sintered body can be further reduced, so that there can be obtained a wear resistant member having a further improved sliding property and rolling life characteristics.

In particular, when the above silicon nitride sintered body is applied to bearing members such as bearing balls, it is effective to perform HIP (hot isostatic pressing) treatment after the normal-pressure-sintering treatment or the pressured-sintering treatment.

The silicon nitride wear resistant member produced by the above method achieves a total oxygen content of 6 mass % or less, a porosity of 0.5% or less, a maximum pore size of 0.3 μm or less, and excellent mechanical characteristics, that is, a three-point bending strength (at room temperature) of 900 MPa or greater.

Further, there can be also obtained a silicon nitride wear resistant member having a crush strength of 200 MPa or more and a fracture toughness of 6.5 MPa·m$^{1/2}$ or more.

Further, according to the manufacturing method of the present invention, there can be obtained the silicon nitride sintered body (the wear resistant member of this invention) having a hardness of 1200 Hv or more and the outer peripheral portion provided with an oxygen content difference i.e. the outer peripheral portion of which oxygen content is 0.2–2 mass % lower than that of the center portion of the sintered body, with a good reproducibility.

According to the silicon nitride wear resistant member and the method of manufacturing the member according to the present invention, the silicon nitride sintered body is manufactured in such a manner that the molded compact is subjected to a predetermined holding treatment on the way to the sintering step, thereafter subjected to a main sintering operation, so that the oxygen content in the sintered body is reduced and the generation of the pore is effectively suppressed thereby to enable the maximum pore size to be extremely small. Therefore, there can be obtained a wear resistant member having an excellent rolling life property and a good durability.

Therefore, when a bearing device is prepared by using this wear resistant member as rolling bearing material, good sliding/rolling characteristics can be maintained for a long time of period, and there can be provided a rotation machine having excellent operational reliability and durability. Further, as an example of another application, the wear resistant member of this invention can be applied to various fields such as engine parts, various tool material, various rails, various rollers or the like.

That is, although the silicon nitride sintered body used in the present invention can be used for various applications, the sintered body is particularly effective to a material for constituting the wear resistant member. An example of the wear resistant member to which this silicon nitride sintered body is applicable may include bearing member, various rollers for rolling machine, compressor vane, gas turbine blade, engine parts such as cam roller or the like. Among these examples, the present invention is particularly effective with respect to the bearing members such as bearing ball of which entire surface constitutes a sliding portion. In more particular, the present invention is significantly effective to a bearing ball having a relatively large diameter of 9 mm or more.

By the way, it goes without saying that, if necessary, the silicon nitride sintered body to be used as the wear resistant member may be subjected to finishing works such as surface grinding or coating treatment or the like. In other words, when the silicon nitride sintered body can be used as the wear resistant member as it is, the silicon nitride sintered body directly constitutes the wear resistant member.

BRIEF DESCRIPTION OF THE DRAWINGS

Other objects and aspects of the present invention will become more apparent from the following description of embodiments with reference to the accompanying drawings in which.

DETAILED DESCRIPTION OF THE PREFERRED EMBODIMENTS

Next, preferred embodiments of the silicon nitride wear resistant member according to the present invention will be explained more concretely on the basis of the following Examples and Comparative Examples.

EXAMPLES 1–2

A material powder mixture for Examples 1–2 was prepared by adding 5 mass % of $Y_2O_3$ (yttrium oxide) powder having an average grain size of 0.9 μm, 5 mass % of $Al_2O_3$ (aluminum oxide) powder having an average grain size of 0.7 μm, 2 mass % of AlN (aluminum nitride) powder having an average grain size of 1.0 μm, and 2 mass % of $TiO_2$ (titan oxide) powder having an average grain size of 0.5 μm, as a sintering assistant agent, to 86 mass % of $Si_3N_4$ (silicon nitride) material powder containing 1.1 mass % of oxygen, and 97% of α-phase type silicon nitride, and having an average grain size of 0.55 μm, followed by wet-mixing the materials in ethyl alcohol for 96 hours using pulverizing balls as pulverization media formed of silicon nitride, and drying the mixture, thereby to prepare a material powder mixture.

After adding a predetermined amount of an organic binder and a solvent to the material powder mixture, thereby to prepare a blended granulated powder. Then, the granulated powder was press-molded at a molding pressure of 130 MPa, thereby to prepare a number of molded compacts each having a dimension of 50 mm (length)×50 mm (width)×5 mm (thickness) as samples for measuring bending strength and a number of molded compacts each having a dimension of 80 mm (diameter)×6 mm (thickness) as samples for measuring rolling life.

Thereafter, thus prepared molded compacts were degreased in air-flowing atmosphere at temperature of 450° C. for 4 hours. Then, the compacts were further heated up to a temperature of 1400° C. in vacuum atmosphere of $10^{-2}$ Pa or lower and held at this state for two hours thereby to conduct a holding operation. Thereafter, the degreased molded compacts were sintered and further densified by holding the compacts in a nitrogen gas ($N_2$) atmosphere under a pressure of 0.7 MPa at a temperature of 1750° C. for 4 hours.

Thereafter, the sintered bodies were moderately cooled at cooling rate of 100° C./hr until the temperature in a sintering furnace was reduced down to 1500° C., by controlling an amount of power supplied to a heating unit associated with the sintering furnace.

Then, thus obtained sintered bodies were subjected to a hot isostatic pressing treatment in which the sintered bodies were heated to a temperature of 1700° C. and held in a pressurized nitrogen atmosphere of 100 MPa for one hour thereby to prepare a number of silicon nitride wear resistant members of Example 1.

In addition, as Example 2, the manufacturing steps were repeated under the same conditions as in Example 1 except that the holding operation on the way to sintering step was performed in such a manner that the molded compact was held in nitrogen gas atmosphere of $1\times10^4$ Pa at a temperature of 1600° C. for 2 hours, thereby to prepare a silicon nitride wear resistant member of Example 2.

COMPARATIVE EXAMPLES 1–3

As comparative Example 1, the manufacturing steps were repeated under the same conditions as in Example 1 except that the holding operation in vacuum atmosphere at temperature of 1400° C. was not performed on the way to sintering step thereby to prepare silicon nitride wear resistant member of Comparative Example 1.

As comparative Example 2 (one sample of which condition was outside the preferable range specified in this invention), the manufacturing steps were repeated under the same conditions as in Example 1 except that the holding operation on the way to sintering step was performed at a temperature of 1600° C. in a nitrogen gas atmosphere of $1\times10^4$ Pa for 2 hours, and the cooling rates after the sintering operation was set to 500° C./hr which was a conventional natural cooling rate, thereby to prepare silicon nitride wear resistant member of Comparative Example 2.

As comparative Example 3, the manufacturing steps were repeated under the same conditions as in Example 1 except that the $Si_3N_4$ (silicon nitride) material powder containing 1.7 mass % of oxygen and 91 mass % of α-phase type silicon nitride, and having an average grain size of 1.5 μm was used, thereby to prepare silicon nitride wear resistant member of Comparative Example 3.

With respect to thus prepared silicon nitride wear resistant members of Examples 1–2 and Comparative Examples 1–3, total oxygen content, porosity, maximum pore size in the grain boundary, three-point bending strength at room temperature, fracture toughness and rolling life were measured. The fracture toughness was measured by Niihara system based on a micro-indentation method. The measured results are shown in table 1.

In addition, the porosity of the sintered body was measured by Archimedes' method, while the maximum pore size in the grain boundary phase was measured as follows. Namely, three regions each having a unit area of 100 μm-length×100 μm-width were arbitrarily set on a cross section of the sintered body constituting the wear resistant member, then an enlarged photographic image was taken with respect to the regions by means of a scanning-type electron microscope (SEM). Among the pores shown in the image, a pore having the largest diameter was selected. As the maximum pore size, a length of a diagonal line having the longest length in the pores shown in the enlarged images was adopted.

Further, the total oxygen content in the silicon nitride sintered body was measured by means of an oxygen analyzer based on an inert gas fusion-infrared absorption method.

Furthermore, the three-point bending strength was measured as follows. That is, bending test pieces each having a dimension of 40 mm (length)×3 mm (width)×4 mm (thickness) were prepared from the respective sintered bodies. Then, the sintered body was supported at a supporting span of 30 mm, while a load-applying speed was set to 0.5 mm/min. Under these conditions, the three-point bending strength was measured.

Figure 1:
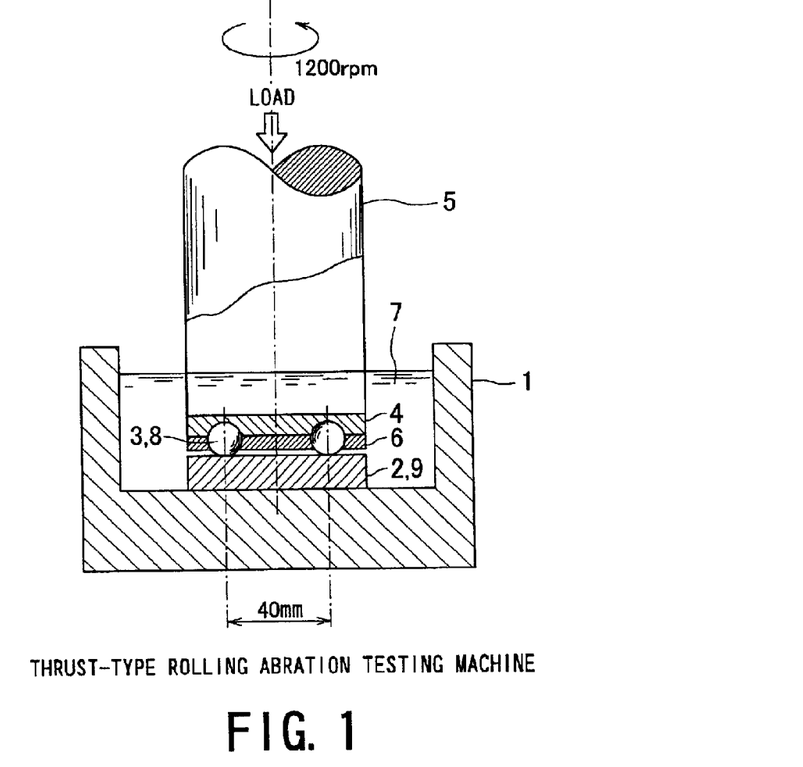
FIG. 1 is a cross sectional view showing a thrust-type rolling abrasion (wear) testing machine for measuring rolling life characteristics of a wear resistant member according to one embodiment of the present invention.

Further, the rolling characteristics of the respective wear resistant members were measured by using a thrust-type rolling abrasion testing machine shown in FIG. 1. This testing machine is constituted by comprising: a plate-shaped wear resistant member 2 disposed in a machine body 1; a plurality of rolling steel balls 3 provided on an upper surface of the wear resistant member 2; a guide plate 4 provided at an upper portion of these rolling steel balls 3; a driving rotation shaft 5 connected to the guide plate 4; and a retainer 6 for regulating a location interval of the rolling steel balls 3. A lubricating oil 7 for lubricating a rolling portion of the balls is poured into the machine body 1. The above rolling steel balls 3 and the guide plate 4 are formed of high-carbon-chromium bearing steel (SUJ2) prescribed by JIS G 4805 (Japanese Industrial Standard). As the above lubricating oil 7, paraffin type lubricating oil (viscosity at 40° C.: 67.2 mm²/S) or turbine oil can be used.

The rolling life of the respective plate-shaped wear resistant members of these embodiments were in such a manner that a circular track having a diameter of 40 mm was set on an upper surface of the wear resistant member 2, three rolling steel balls each having a diameter of 9.525 mm and composed of SUJ2 were provided on the circular track, and the rolling steel balls were rotated on the track at a rotation speed of 1200 rpm under a condition of being applied with a pressing load of 400 Kg and a condition of lubrication by an oil bath filled with turbine oil thereby to measure the rolling life defined as a rotation number of steel balls rolling along the circular track formed on the wear resistant member formed of the silicon nitride sintered body until a surface of the silicon nitride wear resistant member 2 peeled off. The measuring results are shown in Table 1 hereunder.

TABLE 1

| Sample No | Holding Conditions on the way to Sintering Process Temp. × Time × Pressure (° C.) × (hr) × (Pa) | Sintering Conditions Temp. × Time × Pressure (° C.) × (hr) × (MPa) | Cooling Rate after Sintering until 1500° C. (° C./hr) | HIP Conditions Temp × Time × Pressure (° C.) × (hr) × (MPa) | Total Oxygen Content in Sintered Body (mass %) | Porosity (%) | Maximum Pore Size in Grain Boundary ($\mu$m) | Three Point Bending Strength (MPa) | Fracture Toughness (MPa·m$^{1/2}$) | Rolling Life of Circular Plate (Rotation Number) |
|---|---|---|---|---|---|---|---|---|---|---|
| Example 1 | In Vacuum 1400 × 2 × ($\leq 10^{-2}$) | 1750 × 4 × 0.7 | 100 | 1700 × 1 × 100 | 3.8 | 0.02 | 0.05 | 1200 | 7.0 | >1 × 10$^8$ |
| Example 2 | In N$_2$ 1600 × 2 × (1 × 10$^1$) | 1750 × 4 × 0.7 | 100 | 1700 × 1 × 100 | 4.1 | 0.02 | 0.05 | 1150 | 7.0 | >1 × 10$^8$ |
| Comparative Example 1 | None | 1750 × 4 × 0.7 | 100 | 1700 × 1 × 100 | 5.0 | 0.10 | 0.40 | 990 | 6.5 | 5 × 10$^6$ |
| Comparative Example 2 | In N$_2$ 1600 × 2 × (1 × 10$^1$) | 1750 × 4 × 0.7 | 500 | 1700 × 1 × 100 | 4.7 | 0.10 | 0.30 | 1055 | 6.2 | 8 × 10$^6$ |
| Comparative Example 3 | In Vacuum 1400 × 2 × ($\leq 10^2$) | 1750 × 4 × 0.7 | 100 | 1700 × 1 × 100 | 4.2 | 0.40 | 0.60 | 900 | 5.9 | 8 × 10$^5$ |

As is clear from the results shown in Table 1, in the respective silicon nitride wear resistant members of Examples, each of the sintered bodies constituting the wear resistant members was manufactured in such a manner that the molded compact was subjected to a predetermined holding operation on the way to the sintering step, thereafter subjected to the main sintering operation, so that the oxygen content in the sintered body was reduced and the generation of the pore was effectively suppressed thereby to enable the maximum pore size to make extremely small. Therefore, there could be obtained the silicon nitride wear resistant members having good strength characteristics and an excellent durability such that the rolling life exceeded 10$^8$.

On the other hand, in Comparative Example 1 in which the holding operation was not performed on the way to the sintering step, the effect of reducing the oxygen content was small, so that a large amount of pores remained in the sintered body thereby to disadvantageously lower the strength characteristics and rolling life.

Further, when setting the cooling rate to high and the sintered body was rapidly cooled as in Comparative Example 2, the deoxidizing effect was not sufficient, and the effect of minimizing the maximum pore size was small thereby to shorten the rolling life of the wear resistant member.

Furthermore, in case of Comparative Example 3 where the oxygen content in the material powder was excessively large, even if the holding treatment on the way to the sintering step and the moderately cooling treatment were performed, it was confirmed that the porosity was large, and also the maximum pore size became large, so that both the strength and rolling life were lowered.

Next, preferred embodiments of the silicon nitride wear resistant member according to the present invention applied to rolling balls of a bearing member will be explained more concretely on the basis of the following Examples and Comparative Examples.

EXAMPLES 1B–2B AND COMPARATIVE EXAMPLES 1B–3B

Each of the blended granulated powders as prepared in Examples 1–2 and Comparative Examples 1–3 was packed in the molding die and pressed thereby to prepare spherical primary molded bodies. Then, each of the primary molded bodies was subjected to a rubber pressing treatment at a pressure of 120 MPa, thereby to respectively prepare spherically molded bodies as samples each having a diameter of 11 mm for measuring crush strength and rolling fatigue life.

Next, after the respective spherically molded bodies were subjected to the degreasing treatment under the same conditions as in Example 1, the degreased bodies were treated under the conditions of holding operation on the way to sintering step, sintering conditions, the cooling rates after completion of the sintering step, and HIP conditions as shown in table 2. Further, thus obtained sintered bodies were subjected to grinding work so as to provide a ball-shape having a diameter of 9.525 mm and a surface roughness of 0.01 $\mu$m-Ra thereby to prepare the respective rolling balls for a bearing as wear resistant members of Examples 1B–2B and Comparative Examples 1B–3B.

In this connection, the above surface roughness was measured as an arithmetic average surface roughness (Ra) which can be obtained by scanning the surface on equator of the ball by means of a profilometer-type surface roughness measuring device.

With respect to thus prepared rolling balls as the wear resistant members of Examples and Comparative Examples, total oxygen content, porosity, maximum pore size in the grain boundary, crush strength, fracture toughness value and rolling fatigue life were measured.

In this connection, the rolling fatigue life of the respective wear resistant members were measured by using the thrust-type rolling abrasion testing machine shown in FIG. 1. By the way, in the previous Example 1 or the like, an item to be evaluated was a plate-shaped wear resistant member 2 while the balls rolling on the surface of the wear resistant member 2 were the rolling steel balls 3 composed of SUJ2. However, in order to evaluate the silicon nitride rolling balls 8 of Examples 1 B-2B and Comparative Examples 1B–3B, a bearing steel plate 9 composed of SUJ2 was provided and assembled in place of the wear resistant member 2.

The rolling fatigue life of the respective rolling ball was measured in such a manner that three rolling balls 8 each having a diameter of 9.525 mm were formed from the silicon nitride wear resistant member, the three rolling balls 8 were provided on the circular track having a diameter of 40 mm set on the upper surface of the steel plate 9 formed of SUJ2, and the rolling balls 8 were rotated at a rotation speed of 1200 rpm on the track under a condition of being applied with a pressing load so as to impart a maximum contact stress of 5.9 GPa to the balls 8 and a lubricating condition using an oil bath filled with turbine oil, thereby to measure the rolling fatigue life defined as a time until a surface of the rolling balls 8 composed of the silicon nitride wear resistant member peeled off. The measured results are shown in Table 2 hereunder.

The crash strength was measured by using a Instron type testing machine based on the former JIS-B1501 in which two bearing balls each having the same dimension are arranged lengthways and applied with a load at crosshead speed of 5 mm/min.

also the maximum pore size became large, so that both the crush strength and rolling fatigue life were deteriorated.

In this connection, when the rolling fatigue life of the silicon nitride rolling balls were measured, three rolling balls each having a diameter of 9.525 mm were used. However, even if other balls having different diameters were selected or the number of balls to be provided was changed, it was also confirmed that rolling properties in accordance with the load conditions or the rolling conditions could be obtained.

Next, with respect to a plate-shaped wear resistant member prepared through other compositions or treating conditions than those of the previous Examples will be explained more concretely with reference to the following Examples and Comparative Examples.

TABLE 2

Results on Bearing Balls using Granulated Powders prepared in Table 1.

| Sample No. | Holding Conditions on the way to Sintering Process Temp. × Time × Pressure (° C.) × (hr) × (Pa) | Sintering Conditions Temp. × Time × Pressure (° C.) × (hr) × (MPa) | Cooling Rate after Sintering until 1500° C. (° C./hr) | HIP Conditions Temp × Time × Pressure (° C.) × (hr) × (MPa) | Total Oxygen Content in Sintered Body (mass %) | Porosity (%) | Maximum Pore Size in Grain Boundary (μm) | Crush Strength (MPa) | Fracture Toughness (MPa · m$^{1/2}$) | Rolling Fatigue Life of Balls (hr) |
|---|---|---|---|---|---|---|---|---|---|---|
| Example 1B | In Vacuum 1400 × 2 × (≦10$^{-2}$) | 1750 × 4 × 0.7 | 100 | 1700 × 1 × 100 | 3.7 | 0.02 | 0.05 | 300 | 7.1 | >400 |
| Example 2B | In N$_2$ 1600 × 2 × (1 × 10$^1$) | 1750 × 4 × 0.7 | 100 | 1700 × 1 × 100 | 4.0 | 0.02 | 0.05 | 285 | 7.0 | >400 |
| Comparative Example 1B | None | 1750 × 4 × 0.7 | 100 | 1700 × 1 × 100 | 4.9 | 0.10 | 0.40 | 240 | 6.4 | 315 |
| Comparative Example 2B | In N$_2$ 1600 × 2 × (1 × 10$^4$) | 1750 × 4 × 0.7 | 500 | 1700 × 1 × 100 | 4.7 | 0.10 | 0.40 | 260 | 6.2 | 270 |
| Comparative Example 3B | In Vacuum 1400 × 2 × (≦10$^{-2}$) | 1750 × 4 × 0.7 | 100 | 1700 × 1 × 100 | 4.1 | 0.40 | 0.50 | 200 | 6.1 | 230 |

As is clear from the results shown in Table 2, in the respective silicon nitride rolling balls of Examples, each of the sintered bodies constituting the rolling balls was manufactured in such a manner that the molded compact was subjected to a predetermined holding operation on the way to the sintering step, thereafter subjected to the main sintering operation, so that the oxygen content in the sintered body was reduced and the generation of the pore was effectively suppressed thereby to enable the maximum pore size to make extremely small. Therefore, there could be obtained the silicon nitride rolling balls each having high crush strength and an excellent durability such that the rolling fatigue life exceeded 400 hours.

On the other hand, in Comparative Example 1B in which the holding operation was not performed on the way to the sintering step, the effect of reducing the oxygen content was small, so that a large amount of pores remained in the sintered body thereby to disadvantageously lower the crush strength and the rolling fatigue life.

Further, when setting the cooling rate to high and the sintered body was rapidly cooled as in Comparative Example 2B, the deoxidizing effect was not sufficient, and the effect of minimizing the maximum pore size was small thereby to shorten the rolling fatigue life of the wear resistant member.

Furthermore, in case of Comparative Example 3B where the oxygen content in the material powder was excessively large, even if the holding treatment on the way to the sintering step and the moderately cooling treatment were performed, it was confirmed that the porosity was large, and

EXAMPLES 3–27

Material mixtures for Examples 3–27 were prepared so as to provide composition ratios shown in Table 3 by blending Y$_2$O$_3$ powder, Al$_2$O$_3$ powder used in Example 1, oxide powders of various rare earth elements having average grain sizes of 0.9–1.0 μm as shown in Table 3, MgO powder having an average grain size of 0.5 μm, AlN powder having an average grain size of 1.0 μm, and powders of various compounds having average grain sizes of 0.4–0.5 μm with Si$_3$N$_4$ (silicon nitride) material powder used in Example 1.

After thus obtained respective material mixtures were subjected to the molding/degreasing operations under the same conditions as in Example 1, the compacts were subjected to the holding operation on the way to sintering step, the main sintering operation, moderately cooling operation and HIP treatment under the conditions shown in Table 3, thereby to prepare a number of silicon nitride wear resistant members of Examples 3–27.

COMPARATIVE EXAMPLES 4–9

The material mixtures of Comparative Examples 4–9 were respectively prepared as indicated in Table 3. More specifically, an excessively small amount of Y$_2$O$_3$ was added (Comparative Example 4), an excessive amount of Y$_2$O$_3$ was added (Comparative Example 5), an excessive amount of TiO$_2$ was added (Comparative Example 6), an excessive amount of Al$_2$O$_3$ was added (Comparative Example 7), an excessive amount of AlN was added (Comparative Example 8) and an excessive amount of MgO was added (Comparative Example 9).

After thus obtained respective material mixtures were subjected to the molding/degreasing operations under the same conditions as in Example 3, the compacts were subjected to the holding operation on the way to sintering step, the main sintering operation, moderately cooling operation and HIP treatment under the conditions shown in Table 3, thereby to prepare a number of silicon nitride wear resistant members of Comparative Examples 4–9.

With respect to thus prepared silicon nitride wear resistant members of Examples and Comparative Examples, total oxygen content, porosity, maximum pore size in the grain boundary, three-point bending strength at room temperature, fracture toughness and rolling life were measured under the same conditions as in Example 1. The measured results are shown in Table 3 hereunder.

TABLE 3

| Sample No | | $Si_3N_4$ | Material Composition (mass %) | | | | | | Holding Conditions on the way to Sintering Temp. × Time × Pressure (° C.) × (hr) × (Pa) | Sintering Conditions Temp. × Time × Pressure (° C.) × (hr) × (MPa) |
|---|---|---|---|---|---|---|---|---|---|---|
| | | | Rare Earth Oxide | | $Al_2O_3$ | MgO | AlN | Other | | |
| Example | 3 | 87 | $Y_2O_3$ | 5 | 4 | | 3 | $TiO_2$ 1 | In Vacuum 1400 × 2 × (≦$10^2$) | 1800 × 4 × 0.7 |
| | 4 | 87 | $Y_2O_3$ | 5 | 4 | | 3 | $TiO_2$ 1 | In Vacuum 1400 × 2 × (≦$10^2$) | 1800 × 4 × 0.7 |
| | 5 | 88 | $Y_2O_3$ | 5 | 5 | | 2 | | In Vacuum 1400 × 2 × (≦$10^2$) | 1750 × 4 × 0.7 |
| | 6 | 90 | $Y_2O_3$ | 5 | 5 | | | | In Vacuum 1400 × 2 × (≦$10^2$) | 1750 × 4 × 0.7 |
| | 7 | 87 | $Y_2O_3$ | 5 | 2 | | 5 | $TiO_2$ 1 | In Vacuum 1400 × 2 × (≦$10^2$) | 1750 × 4 × 0.7 |
| | 8 | 88 | $Y_2O_3$ | 5 | 2 | | | $TiO_2$ 5 | In Vacuum 1400 × 2 × (≦$10^2$) | 1800 × 4 × 0.7 |
| | 9 | 87 | $Y_2O_3$ | 5 | 1 | 5 | 2 | | In Vacuum 1400 × 2 × (≦$10^2$) | 1800 × 4 × 0.7 |
| | 10 | 82 | $Y_2O_3$ | 10 | 2 | | 5 | $TiO_2$ 1 | In Vacuum 1400 × 2 × (≦$10^2$) | 1750 × 4 × 0.7 |
| | 11 | 86 | $Y_2O_3$ | 10 | 4 | | | | In Vacuum 1400 × 2 × (≦$10^2$) | 1800 × 4 × 0.7 |
| | 12 | 89 | $Y_2O_3$ | 5 | | 3 | 2 | $TiO_2$ 1 | In Vacuum 1400 × 2 × (≦$10^2$) | 1800 × 4 × 0.7 |
| | 13 | 95 | $Y_2O_3$ | 1 | 3 | | | $TiO_2$ 1 | In $N_2$ 1600 × 2 × (1 × $10^4$) | 1850 × 4 × 0.7 |
| | 14 | 88 | $Y_2O_3$ | 5 | | | 5 | $HfO_2$ 2 | In Vacuum 1400 × 2 × (≦$10^2$) | 1750 × 4 × 0.7 |
| | 15 | 87 | $Y_2O_3$ | 5 | 4 | | 3 | $ZrO_2$ 1 | In $N_2$ 1600 × 2 × (1 × $10^4$) | 1750 × 4 × 0.7 |
| | 16 | 87 | $Y_2O_3$ | 5 | 4 | | 3 | $Cr_2O_3$ 1 | In $N_2$ 1600 × 2 × (1 × $10^4$) | 1750 × 4 × 0.7 |
| | 17 | 87 | $Y_2O_3$ | 5 | 4 | | 3 | $Nb_2O_3$ 1 | In $N_2$ 1600 × 2 × (1 × $10^4$) | 1750 × 4 × 0.7 |
| | 18 | 86 | $Y_2O_3$ | 5 | 4 | | 3 | $Ta_2O_3$ 2 | In $N_2$ 1600 × 2 × (1 × $10^4$) | 1750 × 4 × 0.7 |
| | 19 | 86 | $Y_2O_3$ | 5 | 4 | | 3 | WC 2 | In $N_2$ 1600 × 2 × (1 × $10^4$) | 1750 × 4 × 0.7 |
| | 20 | 86 | $Y_2O_3$ | 5 | 4 | | 3 | $Mo_2C$ 2 | In $N_2$ 1600 × 2 × (1 × $10^4$) | 1750 × 4 × 0.7 |
| | 21 | 84 | $Er_2O_3$ | 8 | 4 | | 3 | $TiO_2$ 1 | In Vacuum 1400 × 2 × (≦$10^2$) | 1750 × 4 × 0.7 |
| | 22 | 87 | $CeO_2$ | 5 | 4 | | 3 | $TiO_2$ 1 | In Vacuum 1400 × 2 × (≦$10^3$) | 1750 × 4 × 0.7 |
| | 23 | 84 | $Nd_2O_3$ | 8 | 4 | | 3 | $TiO_2$ 1 | In $N_2$ 1600 × 2 × (1 × $10^4$) | 1750 × 4 × 0.7 |
| | 24 | 84 | $Sm_2O_3$ | 8 | 4 | | 3 | $TiO_2$ 1 | In $N_2$ 1600 × 2 × (1 × $10^4$) | 1750 × 4 × 0.7 |
| | 25 | 84 | $Ho_2O_3$ | 8 | 4 | | 3 | $TiO_2$ 1 | In $N_2$ 1600 × 2 × (1 × $10^4$) | 1750 × 4 × 0.7 |
| | 26 | 84 | $Yb_2O_3$ | 8 | 4 | | 3 | $TiO_2$ 1 | In $N_2$ 1600 × 2 × (1 × $10^4$) | 1750 × 4 × 0.7 |
| | 27 | 87 | $Y_2O_3$ | 5 | 4 | | 3 | $TiO_3$ 1 | In Vacuum 1400 × 2 × (≦$10^2$) | 1800 × 6 × 0.7 |
| Comparative Example | 4 | 91.5 | $Y_2O_3$ | 0.5 | 3 | | 3 | $TiO_2$ 2 | In $N_2$ 1600 × 2 × (1 × $10^4$) | 1850 × 4 × 0.7 |
| | 5 | 77 | $Y_2O_3$ | 15 | 3 | | 3 | $TiO_2$ 2 | In $N_2$ 1600 × 2 × (1 × $10^4$) | 1750 × 4 × 0.7 |
| | 6 | 82 | $Y_2O_3$ | 5 | 3 | | 3 | $TiO_2$ 7 | In $N_2$ 1600 × 2 × (1 × $10^4$) | 1750 × 4 × 0.7 |
| | 7 | 85 | $Y_2O_3$ | 5 | 7 | | 3 | | In $N_2$ 1600 × 2 × (1 × $10^4$) | 1750 × 4 × 0.7 |
| | 8 | 85 | $Y_2O_3$ | 5 | 3 | | 7 | | In $N_2$ 1600 × 2 × (1 × $10^4$) | 1750 × 4 × 0.7 |
| | 9 | 87 | $Y_2O_3$ | 5 | 1 | 7 | | | In $N_2$ 1600 × 2 × (1 × $10^4$) | 1750 × 4 × 0.7 |

| Sample No | | Cooling Rate after Sintering until 1500° C. (° C./hr) | HIP Conditions Temp. × Time × Pressure (° C.) × (hr) × (MPa) | Total Oxygen Content in Sintered Body (mass %) | Porosity (%) | Maximum Pore Size in Grain Boundary (μm) | Three Point Bending Strength (MPa) | Fracture Toughness (MPa·$m^{1/2}$) | Rolling Life of Circular Plate (Rotation Number) |
|---|---|---|---|---|---|---|---|---|---|
| Example | 3 | 50 | — | 3.1 | 0.2 | 0.20 | 990 | 6.9 | >1 × $10^8$ |
| | 4 | 50 | 1700 × 1 × 100 | 3.2 | 0.02 | 0.05 | 1180 | 7.1 | >1 × $10^8$ |
| | 5 | 50 | 1700 × 1 × 100 | 3.8 | 0.05 | 0.05 | 1000 | 6.8 | >1 × $10^8$ |
| | 6 | 100 | 1700 × 1 × 100 | 3.6 | 0.05 | 0.10 | 1150 | 6.7 | >1 × $10^8$ |
| | 7 | 100 | 1700 × 1 × 100 | 3.0 | 0.06 | 0.05 | 1140 | 7.2 | >1 × $10^8$ |
| | 8 | 100 | 1700 × 1 × 100 | 4.2 | 0.03 | 0.05 | 1000 | 7.0 | >1 × $10^8$ |
| | 9 | 100 | — | 4.0 | 0.02 | 0.20 | 980 | 6.8 | >1 × $10^8$ |
| | 10 | 50 | 1700 × 1 × 100 | 3.7 | 0.03 | 0.10 | 920 | 6.7 | >1 × $10^8$ |
| | 11 | 50 | 1700 × 1 × 100 | 4.3 | 0.04 | 0.10 | 950 | 6.7 | >1 × $10^8$ |
| | 12 | 50 | 1700 × 1 × 100 | 3.2 | 0.04 | 0.10 | 1000 | 6.8 | >1 × $10^8$ |
| | 13 | 100 | 1700 × 1 × 100 | 2.7 | 0.1 | 0.10 | 980 | 6.7 | >1 × $10^8$ |
| | 14 | 100 | 1700 × 1 × 100 | 1.8 | 0.04 | 0.05 | 1250 | 7.3 | >1 × $10^8$ |
| | 15 | 100 | 1700 × 1 × 100 | 3.6 | 0.05 | 0.05 | 1200 | 7 | >1 × $10^8$ |
| | 16 | 100 | 1700 × 1 × 100 | 3.6 | 0.05 | 0.05 | 1150 | 6.9 | >1 × $10^8$ |
| | 17 | 100 | 1700 × 1 × 100 | 3.6 | 0.05 | 0.05 | 1100 | 6.8 | >1 × $10^8$ |
| | 18 | 100 | 1700 × 1 × 100 | 3.6 | 0.05 | 0.02 | 1120 | 6.9 | >1 × $10^8$ |
| | 19 | 100 | 1700 × 1 × 100 | 3.5 | 0.05 | 0.10 | 1100 | 6.9 | >1 × $10^8$ |
| | 20 | 100 | 1700 × 1 × 100 | 3.5 | 0.05 | 0.05 | 1180 | 6.8 | >1 × $10^8$ |
| | 21 | 100 | 1700 × 1 × 100 | 3.4 | 0.03 | 0.04 | 1150 | 6.7 | >1 × $10^8$ |
| | 22 | 100 | 1700 × 1 × 100 | 3.2 | 0.05 | 0.06 | 1080 | 6.7 | >1 × $10^8$ |
| | 23 | 100 | 1700 × 1 × 100 | 3.5 | 0.04 | 0.04 | 1060 | 6.7 | >1 × $10^8$ |
| | 24 | 100 | 1700 × 1 × 100 | 3.6 | 0.05 | 0.05 | 1050 | 6.8 | >1 × $10^8$ |
| | 25 | 100 | 1700 × 1 × 100 | 3.2 | 0.05 | 0.04 | 1100 | 7.0 | >1 × $10^8$ |

TABLE 3-continued

|  | Sample No |  |  |  |  |  |  |  |  |
|---|---|---|---|---|---|---|---|---|---|
|  | 26 | 100 | 1700 × 1 × 100 | 3.1 | 0.03 | 0.05 | 1110 | 6.8 | >1 × 10$^8$ |
|  | 27 | 100 | 1750 × 1 × 100 | 3.0 | 0.0001 | 0.01 | 1200 | 7.2 | >1 × 10$^8$ |
| Comparative Example | 4 | 100 | 1700 × 1 × 100 | 3.0 | 0.9 | 0.30 | 850 | 5.6 | 6 × 10$^4$ |
|  | 5 | 100 | 1700 × 1 × 100 | 5.5 | 0.1 | 0.40 | 900 | 5.8 | 7 × 10$^5$ |
|  | 6 | 100 | 1700 × 1 × 100 | 6.0 | 0.2 | 0.40 | 985 | 6.3 | 1 × 10$^6$ |
|  | 7 | 100 | 1700 × 1 × 100 | 5.0 | 0.1 | 0.30 | 890 | 5.9 | 4 × 10$^5$ |
|  | 8 | 100 | 1700 × 1 × 100 | 5.2 | 0.05 | 0.30 | 910 | 5.5 | 7 × 10$^4$ |
|  | 9 | 100 | 1700 × 1 × 100 | 4.0 | 0.1 | 0.40 | 900 | 6.0 | 5 × 10$^4$ |

As is clear from the results shown in Table 3, in the respective silicon nitride wear resistant members of Examples each of which was manufactured in such a manner that the material powder mixture containing specified rare earth element and oxygen was molded to form the compact, then the compact was subjected to the holding treatment under the predetermined conditions on the way to the sintering step, followed by being subjected to the main sintering operation and moderately cooling the sintered body, so that the oxygen content in the sintered bodies was effectively reduced and the generation of the pore was suppressed thereby to enable the maximum pore size to be extremely small. Therefore, there could be obtained the silicon nitride wear resistant members having good strength characteristics and an excellent durability such that the rolling life exceeded 10$^8$.

On the other hand, in the silicon nitride sintered bodies as shown in Comparative Examples 4–9 in which the amount of rare earth elements were set to outside the preferable range specified in the present invention, even if the holding treatment on the way to the sintering step and the moderately cooling operation after the sintering operation were performed, the rolling life of the surface of the wear resistant member was lowered, and it was confirmed that the sintered bodies of Comparative Examples could not satisfy at least one of the required characteristics such as total oxygen content, porosity, maximum pore size, three-point bending strength or the like that were specified in the present invention.

Next, preferred embodiments of the wear resistant members of the above Examples 3–27 and Comparative Examples 4–9 applied to rolling balls of a bearing member will be explained more concretely on the basis of the following Examples and Comparative Examples.

EXAMPLES 3B–27B AND COMPARATIVE EXAMPLES 4B–9B

Each of the blended granulated powders as prepared in Examples 3–27 and Comparative Examples 4–9 was packed in the molding die and pressed thereby to prepare spherical primary molded bodies. Then, each of the primary molded bodies was subjected to a rubber pressing treatment at a pressure of 100 MPa, thereby to respectively prepare spherically molded bodies as samples each having a diameter of 11 mm for measuring crush strength and rolling fatigue life.

Next, after the respective spherically molded bodies were subjected to the degreasing treatment under the same conditions as in Example 1, the degreased bodies were treated under the conditions of the holding operation on the way to sintering step, sintering conditions, the cooling rates after completion of the sintering step, and HIP conditions as shown in table 4. Further, thus obtained sintered bodies were subjected to grinding work so as to provide a ball-shape having a diameter of 9.525 mm and a surface roughness of 0.01 μm-Ra thereby to prepare the respective rolling balls for a bearing as wear resistant members of Examples 3B–27B and Comparative Examples 4B–9B.

In this connection, the above surface roughness was measured as an arithmetic average surface roughness (Ra) obtained by scanning the surface on equator of the ball by means of a profilometer-type surface roughness measuring device.

With respect to thus prepared rolling balls as the wear resistant members of the respective Examples and Comparative Examples, total oxygen content, porosity, maximum pore size in the grain boundary, crush strength, fracture toughness value and rolling fatigue life were measured as the same manner as in Example 1 B. The measured results are shown in Table 4 hereunder.

TABLE 4

Results on Bearing Balls using Granulated Powders prepared in Table 3.

| Sample No | | Material Composition (mass %) | | | | | | Holding Conditions on the way to Sintering Temp × Time × Pressure (° C.) × (hr) × (Pa) | Sintering Conditions Temp × Time × Pressure (° C.) × (hr) × (MPa) |
|---|---|---|---|---|---|---|---|---|---|
| | | Si$_3$N$_4$ | Rare Earth Oxide | Al$_2$O$_3$ | MgO | AlN | Other | | |
| Example | 3B | 87 | Y$_2$O$_3$ 5 | 4 | | 3 | TiO$_2$ 1 | In Vacuum 1400 × 2 × (≦10$^2$) | 1800 × 4 × 0.7 |
| | 4B | 87 | Y$_2$O$_3$ 5 | 4 | | 3 | TiO$_2$ 1 | In Vacuum 1400 × 2 × (≦10$^2$) | 1800 × 4 × 0.7 |
| | 5B | 88 | Y$_2$O$_3$ 5 | 5 | | 2 | | In Vacuum 1400 × 2 × (≦10$^2$) | 1750 × 4 × 0.7 |
| | 6B | 90 | Y$_2$O$_3$ 5 | 5 | | | | In Vacuum 1400 × 2 × (≦10$^2$) | 1750 × 4 × 0.7 |
| | 7B | 87 | Y$_2$O$_3$ 5 | 2 | | 5 | TiO$_2$ 1 | In Vacuum 1400 × 2 × (≦10$^2$) | 1750 × 4 × 0.7 |
| | 8B | 88 | Y$_2$O$_3$ 5 | 2 | | | TiO$_2$ 5 | In Vacuum 1400 × 2 × (≦10$^2$) | 1800 × 4 × 0.7 |
| | 9B | 87 | Y$_2$O$_3$ 5 | 1 | 5 | 2 | | In Vacuum 1400 × 2 × (≦10$^2$) | 1800 × 4 × 0.7 |
| | 10B | 82 | Y$_2$O$_3$ 10 | 2 | | 5 | TiO$_2$ 1 | In Vacuum 1400 × 2 × (≦10$^2$) | 1750 × 4 × 0.7 |
| | 11B | 86 | Y$_2$O$_3$ 10 | 4 | | | | In Vacuum 1400 × 2 × (≦10$^2$) | 1800 × 4 × 0.7 |
| | 12B | 89 | Y$_2$O$_3$ 5 | | 3 | 2 | TiO$_2$ 1 | In Vacuum 1400 × 2 × (≦10$^3$) | 1800 × 4 × 0.7 |
| | 13B | 95 | Y$_2$O$_3$ 1 | 3 | | | TiO$_2$ 1 | In N$_2$ 1600 × 2 × (1 × 10$^4$) | 1850 × 4 × 0.7 |
| | 14B | 88 | Y$_2$O$_3$ 5 | | | 5 | HfO$_2$ 2 | In Vacuum 1400 × 2 × (≦10$^2$) | 1750 × 4 × 0.7 |
| | 15B | 87 | Y$_2$O$_3$ 5 | 4 | | 3 | ZrO$_2$ 1 | In N$_2$ 1600 × 2 × (1 × 10$^4$) | 1750 × 4 × 0.7 |

TABLE 4-continued

Results on Bearing Balls using Granulated Powders prepared in Table 3.

|  | Sample No | | | | | | | | | |
|---|---|---|---|---|---|---|---|---|---|---|
|  | 16B | 87 | $Y_2O_3$ | 5 | 4 | 3 | $Cr_2O_3$ | 1 | In $N_2$ 1600 × 2 × (1 × 10$^4$) | 1750 × 4 × 0.7 |
|  | 17B | 87 | $Y_2O_3$ | 5 | 4 | 3 | $Nb_2O_3$ | 1 | In $N_2$ 1600 × 2 × (1 × 10$^4$) | 1750 × 4 × 0.7 |
|  | 18B | 86 | $Y_2O_3$ | 5 | 4 | 3 | $Ta_2O_5$ | 2 | In $N_2$ 1600 × 2 × (1 × 10$^4$) | 1750 × 4 × 0.7 |
|  | 19B | 86 | $Y_2O_3$ | 5 | 4 | 3 | WC | 2 | In $N_2$ 1600 × 2 × (1 × 10$^4$) | 1750 × 4 × 0.7 |
|  | 20B | 86 | $Y_2O_3$ | 5 | 4 | 3 | $Mo_2C$ | 2 | In $N_2$ 1600 × 2 × (1 × 10$^4$) | 1750 × 4 × 0.7 |
|  | 21B | 84 | $Er_2O_3$ | 8 | 4 | 3 | $TiO_3$ | 1 | In Vacuum 1400 × 2 × ($\leq 10^2$) | 1750 × 4 × 0.7 |
|  | 22B | 87 | $CeO_2$ | 5 | 4 | 3 | $TiO_2$ | 1 | In Vacuum 1400 × 2 × ($\leq 10^2$) | 1750 × 4 × 0.7 |
|  | 23B | 84 | $Nd_2O_3$ | 8 | 4 | 3 | $TiO_2$ | 1 | In $N_2$ 1600 × 2 × (1 × 10$^4$) | 1750 × 4 × 0.7 |
|  | 24B | 84 | $Sm_2O_3$ | 8 | 4 | 3 | $TiO_2$ | 1 | In $N_2$ 1600 × 2 × (1 × 10$^4$) | 1750 × 4 × 0.7 |
|  | 25B | 84 | $Ho_2O_3$ | 8 | 4 | 3 | $TiO_2$ | 1 | In $N_2$ 1600 × 2 × (1 × 10$^4$) | 1750 × 4 × 0.7 |
|  | 26B | 84 | $Yb_2O_3$ | 8 | 4 | 3 | $TiO_2$ | 1 | In $N_2$ 1600 × 2 × (1 × 10$^4$) | 1750 × 4 × 0.7 |
|  | 27B | 87 | $Y_2O_3$ | 5 | 4 | 3 | $TiO_2$ | 1 | In Vacuum 1400 × 2 × ($\leq 10^2$) | 1800 × 6 × 0.7 |
| Comparative Example | 4B | 91.5 | $Y_3O_3$ | 0.5 | 3 | 3 | $TiO_2$ | 2 | In $N_2$ 1600 × 2 × (1 × 10$^4$) | 1850 × 4 × 0.7 |
|  | 5B | 77 | $Y_3O_3$ | 15 | 3 | 3 | $TiO_2$ | 2 | In $N_2$ 1600 × 2 × (1 × 10$^4$) | 1750 × 4 × 0.7 |
|  | 6B | 82 | $Y_3O_3$ | 5 | 3 | 3 | $TiO_2$ | 7 | In $N_2$ 1600 × 2 × (1 × 10$^4$) | 1750 × 4 × 0.7 |
|  | 7B | 85 | $Y_2O_3$ | 5 | 7 | 3 |  |  | In $N_2$ 1600 × 2 × (1 × 10$^4$) | 1750 × 4 × 0.7 |
|  | 8B | 85 | $Y_2O_3$ | 5 | 3 | 7 |  |  | In $N_2$ 1600 × 2 × (1 × 10$^4$) | 1750 × 4 × 0.7 |
|  | 9B | 87 | $Y_2O_3$ | 5 | 1 | 7 |  |  | In $N_2$ 1600 × 2 × (1 × 10$^4$) | 1750 × 4 × 0.7 |

|  | Sample No | Cooling Rate after Sintering until 1500° C. (° C./hr) | HIP Conditions Temp. × Time × Pressure (° C.) × (hr) × (MPa) | Total Oxygen Content in Sintered Body (mass %) | Porosity (%) | Maximum Pore Size in Grain Boundary (μm) | Crush Strength (MPa) | Fracture Toughness (MPa · m$^{1/2}$) | Rolling Fatigue Life of Balls (hr) |
|---|---|---|---|---|---|---|---|---|---|
| Example | 3B | 50 | — | 3.0 | 0.2 | 0.20 | 250 | 6.9 | >400 |
|  | 4B | 50 | 1700 × 1 × 100 | 3.2 | 0.03 | 0.04 | 290 | 7.1 | >400 |
|  | 5B | 50 | 1700 × 1 × 100 | 3.7 | 0.04 | 0.05 | 270 | 6.8 | >400 |
|  | 6B | 100 | 1700 × 1 × 100 | 3.5 | 0.06 | 0.09 | 275 | 6.7 | >400 |
|  | 7B | 100 | 1700 × 1 × 100 | 3.0 | 0.06 | 0.05 | 270 | 7.2 | >400 |
|  | 8B | 100 | 1700 × 1 × 100 | 4.0 | 0.03 | 0.05 | 260 | 7.0 | >400 |
|  | 9B | 100 | — | 4.0 | 0.02 | 0.15 | 245 | 6.8 | >400 |
|  | 10B | 50 | 1700 × 1 × 100 | 3.5 | 0.03 | 0.10 | 230 | 6.7 | >400 |
|  | 11B | 50 | 1700 × 1 × 100 | 4.1 | 0.03 | 0.10 | 235 | 6.7 | >400 |
|  | 12B | 50 | 1700 × 1 × 100 | 3.2 | 0.04 | 0.10 | 245 | 6.8 | >400 |
|  | 13B | 100 | 1700 × 1 × 100 | 2.7 | 0.1 | 0.10 | 250 | 6.7 | >400 |
|  | 14B | 100 | 1700 × 1 × 100 | 1.7 | 0.04 | 0.05 | 300 | 7.3 | >400 |
|  | 15B | 100 | 1700 × 1 × 100 | 3.6 | 0.05 | 0.04 | 295 | 7 | >400 |
|  | 16B | 100 | 1700 × 1 × 100 | 3.5 | 0.05 | 0.05 | 280 | 6.9 | >400 |
|  | 17B | 100 | 1700 × 1 × 100 | 3.5 | 0.05 | 0.05 | 275 | 6.8 | >400 |
|  | 18B | 100 | 1700 × 1 × 100 | 3.6 | 0.04 | 0.02 | 270 | 6.9 | >400 |
|  | 19B | 100 | 1700 × 1 × 100 | 3.5 | 0.05 | 0.08 | 270 | 6.9 | >400 |
|  | 20B | 100 | 1700 × 1 × 100 | 3.4 | 0.05 | 0.05 | 280 | 6.8 | >400 |
|  | 21B | 100 | 1700 × 1 × 100 | 3.4 | 0.02 | 0.04 | 285 | 6.7 | >400 |
|  | 22B | 100 | 1700 × 1 × 100 | 3.2 | 0.05 | 0.06 | 260 | 6.7 | >400 |
|  | 23B | 100 | 1700 × 1 × 100 | 3.4 | 0.03 | 0.04 | 260 | 6.7 | >400 |
|  | 24B | 100 | 1700 × 1 × 100 | 3.6 | 0.05 | 0.05 | 250 | 6.8 | >400 |
|  | 25B | 100 | 1700 × 1 × 100 | 3.2 | 0.05 | 0.04 | 270 | 7.0 | >400 |
|  | 26B | 100 | 1700 × 1 × 100 | 3.1 | 0.03 | 0.05 | 285 | 6.8 | >400 |
|  | 27B | 100 | 1750 × 1 × 100 | 3.0 | 0.0001 | 0.01 | 300 | 7.2 | >400 |
| Comparative Example | 4B | 100 | 1700 × 1 × 100 | 2.9 | 0.9 | 0.25 | 195 | 5.6 | 220 |
|  | 5B | 100 | 1700 × 1 × 100 | 5.4 | 0.09 | 0.40 | 210 | 5.8 | 290 |
|  | 6B | 100 | 1700 × 1 × 100 | 6.0 | 0.15 | 0.40 | 250 | 6.3 | 240 |
|  | 7B | 100 | 1700 × 1 × 100 | 4.9 | 0.1 | 0.25 | 200 | 5.9 | 200 |
|  | 8B | 100 | 1700 × 1 × 100 | 5.2 | 0.05 | 0.30 | 200 | 5.5 | 210 |
|  | 9B | 100 | 1700 × 1 × 100 | 3.9 | 0.1 | 0.35 | 205 | 6.0 | 150 |

As is clear from the results shown in Table 4, in the respective silicon nitride rolling balls of Examples each of which was manufactured in such a manner that the material powder mixture containing specified rare earth element and oxygen was molded to form the compact, then the molded compact was subjected to a predetermined holding operation on the way to the sintering step, thereafter subjected to the main sintering operation and the moderately cooling operation after the completion of the sintering operation, so that the oxygen content in the rolling balls of Examples was effectively reduced and the generation of the pore was effectively suppressed thereby to enable the maximum pore size to make extremely small. Therefore, there could be obtained the silicon nitride rolling balls each having high crush strength and an excellent durability such that the rolling fatigue life exceeded 400 hours.

On the other hand, in the silicon nitride sintered bodies as shown in Comparative Examples 4B–9B in which the amount of rare earth elements were set to outside the preferable range specified in the present invention, even if the holding treatment on the way to the sintering step and the moderately cooling operation after the sintering operation were performed, the rolling fatigue life of the rolling balls was lowered, and it was confirmed that the sintered bodies of Comparative Examples could not satisfy at least one of the required characteristics such as total oxygen content, porosity, maximum pore size, three-point bending strength or the like that were specified in the present invention.

Next, concrete embodiments of the present invention and evaluation results of wear resistant members formed with portions having different oxygen contents will be explained hereunder.

EXAMPLES 101–105 AND COMPARATIVE EXAMPLES 101–102

Material powder mixtures were prepared by blending rare earth compound powder, aluminum compound powder and other metal compound powder as sintering assistant agents with silicon nitride ($Si_3N_4$) material powder containing 1.2 mass % of oxygen so as to provide material compositions shown in Table 5, followed by wet-mixing the material powder mixtures by means of a wet-type ball mill, and drying the material powder mixtures.

After adding a predetermined amount of an organic binder to each of the material powder mixtures, the mixtures were press-molded in accordance with CIP (cold isostatic pressing) method (molding pressure: 100 MPa) thereby to prepare the respective spherically molded compacts. Thereafter, thus prepared molded compacts were degreased in air-flowing atmosphere at temperature of 450° C. Then, the compacts were further heated up to a temperature of 1200–1500° C. in vacuum atmosphere of 0.01 Pa or lower and held at this temperature for 2–6 hours thereby to conduct a holding operation. Thereafter, nitrogen gas was introduced into the sintering furnace, and the degreased molded compacts were sintered at a temperature of 1600–1700° C. for 2–5 hours thereby to obtain the spherical sintered bodies (silicon nitride sintered bodies).

As comparative Example 101, the manufacturing steps were repeated under the same conditions as in Example 102 except that the molded compact was heated from an ordinary temperature and sintered in the nitrogen gas atmosphere without performing the heating operation and the holding operation in vacuum atmosphere on the way to sintering step thereby to prepare spherical sintered bodies (silicon nitride sintered bodies) of Comparative Example 101.

As comparative Example 102, the manufacturing steps were repeated under the same conditions as in Example 101 except that a composition ratio was set to a condition such that the total oxygen content exceeded 6 mass %, thereby to prepare spherical sintered bodies (silicon nitride sintered bodies) of Comparative Example 102.

With respect to thus prepared spherical sintered bodies as the wear resistant members of the respective Examples 101–105 and Comparative Examples 101–102, oxygen contents of a center portion and an outer peripheral portion, and Vickers' hardness of the spherical sintered bodies were measured.

The oxygen content was measured in such a manner that three measuring points were arbitrarily selected from each of the center portion A and the outer peripheral portion B in a cross sectional area of the spherical sintered body, the oxygen contents were respectively measured at the measuring points by means of EPMA (electron probe micro analyzer), and these measured values were averaged. The Vickers' hardness was measured on the basis of a method prescribed in JIS R-1610 (testing load: 98.07N).

Further, a content difference of metal components constituting the sintering assistant agents was also measured at both portions of the center portion A and the outer peripheral portion B of the respective spherical sintered bodies. Furthermore, with respect to each of the spherical sintered bodies, a percent defective due to cracks or chipping of the sintered bodies after the sintering operation was also measured. The measured results are shown in Table 5 hereunder. Note, the above measuring operations were performed in a state where, so called "as-sintered surface" was remained as it was on the sintered bodies.

TABLE 5

| Sample No. | Material Composition (mass %) | | | | | | Oxygen Content (mass %) | | Content Difference in Metal Component (mass %) | Vickers Hardness (Hv) | Percent Defective after Sintering (%) |
|---|---|---|---|---|---|---|---|---|---|---|---|
| | Rare Earth Compound | | Al Compound | | Other Additive | | Center Portion | Outer Peripheral Portion | | | |
| Example 101 | $Y_2O_3$ | 3 | $Al_2O_3$ | 3 | $TiO_2$ | 0.6 | 2.8 | 2.4 | <0.2 | 1400 | ≦3 |
| Example 102 | $Y_2O_3$ | 5 | $Al_2O_3$ | 5 | $TiO_2$ | 1.5 | 4.1 | 3.6 | <0.2 | 1400 | ≦3 |
| Example 103 | $Y_2O_3$ | 5 | $Al_2O_3$ | 4 | $HfO_2$ | 1.0 | 3.3 | 2.5 | <0.2 | 1450 | ≦3 |
| | | | AlN | 4 | | | | | <0.2 | | |
| Example 104 | $Y_2O_3$ | 8 | $Al_2O_3$ | 5 | $ZrO_2$ | 1.0 | 4.5 | 3.8 | <0.2 | 1400 | ≦3 |
| Example 105 | $Y_2O_3$ | 6 | $Al_2O_3$ | 3 | — | — | 3.0 | 2.3 | <0.2 | 1350 | ≦3 |
| Comparative Example 101 | $Y_2O_3$ | 5 | $Al_2O_3$ | 5 | $TiO_2$ | 1.5 | 5.0 | 4.9 | <0.2 | 1400 | 8 |
| Comparative Example 102 | $Y_2O_3$ | 6 | $Al_2O_3$ | 4 | $TiO_2$ | 8.0 | 6.8 | 6.0 | <0.2 | 1100 | 10 |

As is clear from the results shown in Table 5, it can be confirmed that each of the silicon nitride sintered bodies of Examples according to the present invention has a large difference in the oxygen content between the center portion and the outer peripheral portion. Further, the amount of oxygen to be a factor for generating the defects was small at the outer peripheral portion, the percent defective due to cracks or chipping of the sintered bodies was found to be small. In addition, the defects caused at the outer peripheral portion was small, so that it became possible to reduce labor cost and manufacturing cost required for a surface working.

In this connection, when the total oxygen contents of the respective silicon nitride sintered bodies of Examples were measured by means of the oxygen analyzer based on an inert gas fusion-infrared absorption method, all of the total oxygen contents was at most 6 mass %.

EXAMPLES 106–110 AND COMPARATIVE EXAMPLE 103

Primary bearing balls each composed of silicon nitride sintered bodies and each having a diameter of 11 mm were prepared so as to provide the same compositions as those of Examples 101–105 and Comparative Example 101. The sintered bodies constituting the respective primary bearing balls were manufactured by further conducting HIP (hot isostatic pressing) treatment with respect to the sintered bodies of Examples 101–105 and Comparative Example 101.

With respect to the primary bearing balls, the oxygen content was measured as the same manner as in Example 101 at three portions i.e. an outer peripheral portion 30 µm apart from a surface, an intermediate portion 1 mm apart from the surface and the center portion. The results are shown in Table 6 hereunder. Furthermore, the respective primary bearing balls were subjected to a grinding work thereby to prepare finished bearing balls each having a diameter of 9.525 mm and a surface roughness of 0.3 µm-Ra.

TABLE 6

| Sample No. | Material Composition | Oxygen Content (mass %) | | | Content Difference of Metal Component between Center Portion and Outer Peripheral Portion (mass %) |
| --- | --- | --- | --- | --- | --- |
| | | Center Portion | Intermediate Portion | Outer Peripheral Portion | |
| Example 106 | Example 101 | 2.8 | 2.6 | 2.5 | <0.2 |
| Example 107 | Example 102 | 4.1 | 3.9 | 3.7 | <0.2 |
| Example 108 | Example 103 | 3.3 | 3.0 | 2.6 | <0.2 |
| Example 109 | Example 104 | 4.5 | 4.2 | 3.9 | <0.2 |
| Example 110 | Example 105 | 3.0 | 2.7 | 2.4 | <0.2 |
| Comparative Example 103 | Comparative Example 101 | 5.0 | 5.0 | 5.0 | <0.2 |

As is clear from the results shown in Table 6, it can be confirmed that each of the bearing balls (finished bearing balls) of Examples according to the present invention has an oxygen content gradient in which the oxygen content is substantially decreased gradually from the center portion towards the outer peripheral portion.

EXAMPLES 111–113 AND COMPARATIVE EXAMPLE 104–108

Primary bearing balls having diameters as indicated in Table 7 were prepared by adopting the same composition and manufacturing method as used in Example 107, thereby to prepare the balls of Examples 111–113.

As Comparative Example 104, primary bearing balls having a diameter of 2 mm were prepared by adopting the same composition and manufacturing method as used in Example 107, thereby to prepare the balls of Comparative Example 104.

As Comparative Examples 105–108, primary bearing balls having diameters as indicated in Table 7 were prepared by adopting the same composition and manufacturing method (without conducting the heating operation in vacuum and the holding operation) as used in Comparative Example 103, thereby to prepare the balls of Comparative Examples 105–108.

With respect to the primary bearing balls, the oxygen content was measured as the same manner as in Example 101 at three portions i.e. the outer peripheral portion, the intermediate portion and the center portion. Furthermore, the percent defective due to cracks or chipping of the sintered bodies after the sintering operation was also measured.

In this connection, the percent defective of the sintered bodies was measured as a percentage of the defective sintered bodies having at least one crack capable of being detected through a visual observation for the surface of the sintered bodies. The results are shown in Table 7 hereunder.

TABLE 7

| Sample No. | Diameter of Primary Bearing Balls (mm) | Oxygen Content (mass %) | | | Percent Defective after Sintering (%) |
| --- | --- | --- | --- | --- | --- |
| | | Center Portion | Intermediate Portion | Outer Peripheral Portion | |
| Example 111 | 40 | 4.3 | 4.2 | 3.7 | ≦3 |
| Example 112 | 20 | 4.2 | 4.1 | 3.6 | ≦3 |
| Example 113 | 9 | 4.1 | 3.9 | 3.6 | ≦3 |
| Comparative Example 104 | 2 | 3.9 | 3.9 | 3.9 | 3 |

TABLE 7-continued

| Sample No. | Diameter of Primary Bearing Balls (mm) | Oxygen Content (mass %) | | | Percent Defective after Sintering (%) |
| --- | --- | --- | --- | --- | --- |
| | | Center Portion | Intermediate Portion | Outer Peripheral Portion | |
| Comparative Example 105 | 40 | 5.4 | 5.4 | 5.4 | 30 |
| Comparative Example 106 | 20 | 5.2 | 5.2 | 5.2 | 10 |
| Comparative Example 107 | 9 | 5.0 | 5.0 | 5.0 | 10 |
| Comparative Example 108 | 2 | 5.0 | 5.0 | 5.0 | 5 |

As is clear from the results shown in Table 7, it can be confirmed that the primary bearing balls each having a diameter of 9 mm or more of Examples according to the present invention clearly have a difference in the oxygen content between the center portion and the outer peripheral portion. Further, the percent defective of these primary bearing-balls (silicon nitride sintered body) were found to be small.

On the other hand, in case of the primary bearing balls each having a diameter of 2 mm, the oxygen-content gradient was hardly caused. This reason is considered as follows. That is, when the ball is small so as to have a diameter of about 2 mm, a volume of the ball is small and the amount of unnecessary gas components existing in the ball is relatively small, so that the effect of the vacuum treatment is also very small.

In addition, when the vacuum treatment was not performed as in Comparative Examples 105–108, the resultant primary bearing balls (silicon nitride sintered body) were found to provide a large percent defective. In view of these facts, it is easily understood that the present invention is particularly effective to the bearing balls each having a diameter of 9 mm or more.

In this regard, as described above, Comparative Examples 104 was one sample of which diameter condition was set to outside the preferable range specified in this invention and showed that the gradient in oxygen content was not formed in the small ball having a diameter of 2 mm even if the molded ball was subjected to the vacuum treatment.

However, the present invention does not mean to exclude such small bearing balls each having a diameter of about 2 mm. For example, as is clearly understood from a comparison of Comparative Examples 104 with Comparative Examples 108, the percent defective in Comparative Examples 104 manufactured through the vacuum treatment could be rather lowered than that of Comparative Examples 108. In view of this fact, it can be said that the present invention is effective to also the small bearing balls having a small diameter.

EXAMPLES 114–115

A material powder mixture was prepared by blending 5 mass % of yttrium oxide powder, 3 mass % of aluminum oxide powder, 4 mass % of aluminum nitride powder and 0.8 mass % of titan oxide powder with 87.2 mass % of silicon nitride ($Si_3N_4$) material powder containing 0.8 mass % of oxygen.

After adding a predetermined amount of an organic binder to the material powder mixture, the mixture was press-molded in accordance with CIP (cold isostatic pressing) method (molding pressure: 100 MPa) thereby to prepare the respective spherically molded compacts. Thereafter, thus prepared molded compacts were degreased in air-flowing atmosphere at temperature of 450° C. Then, the compacts were further heated in a vacuum atmosphere thereby to conduct a vacuum treatment under the conditions indicated in Table 8.

Thereafter, nitrogen gas was introduced into the sintering furnace, and the degreased molded compacts were sintered in a nitrogen atmosphere at a temperature of 1650° C. for 5 hours, and further subjected to HIP treatment, thereby to obtain the primary and spherical bearing balls (silicon nitride sintered bodies) each having a diameter of 15 mm.

With respect to thus obtained primary and spherical bearing balls composed of silicon nitride sintered bodies as the wear resistant members of the respective Examples 114–115, the percent defective of the balls was measured while the oxygen contents were measured at three portions of the outer peripheral portion, the intermediate portion and the center portion of the spherical sintered bodies as in the same manner as in Example 101.

Furthermore, after the respective primary bearing balls were subjected to a grinding work so as to prepare finished bearing balls each having a surface roughness of 0.1 μm-Ra, then the abrasion test (wear resistance test) was performed. The abrasion test was conducted by using the thrust-type rolling abrasion testing machine shown in FIG. 2, and a time until the surface of the bearing balls were peeled off was measured. The measured results are shown in Table 8 hereunder.

TABLE 8

| Sample No. | Vacuum Treatment | Oxygen Content (mass %) | | | Percent Defective after Sintering (%) | Abrasion test (hr) |
| --- | --- | --- | --- | --- | --- | --- |
| | | Center Portion | Intermediate Portion | Outer Peripheral Portion | | |
| Example 114 | 0.01 Pa × 1250° C. × 5 Hrs | 3.0 | 2.9 | 2.8 | ≦3 | ≧400 |
| Example 115 | 0.01 Pa × 1450° C. × 6 Hrs | 3.0 | 2.9 | 2.6 | ≦3 | ≧400 |

As is clear from the results shown in Table 8, it was confirmed that the bearing balls composed of silicon nitride sintered bodies as the wear resistant members of the present invention were excellent in wear resistance.

According to the silicon nitride sintered body constituting the wear resistant member of Examples, for example, it becomes possible to satisfy various characteristics required for the wear resistant member, to reduce the percent defective, and to save a cost required for working the sintered body. Therefore, when the silicon nitride sintered bodies of respective Examples are used, it becomes possible to provide a wear resistant member excellent in reliability and life characteristics, and capable of reducing the manufacturing cost.

As described above, according to the silicon nitride wear resistant member and the method of manufacturing the member of the present invention, the silicon nitride sintered body is manufactured in such a manner that the molded compact is subjected to a predetermined holding treatment on the way to the sintering step, thereafter subjected to a main sintering operation, so that the oxygen content in the sintered body is reduced and the generation of the pore is effectively suppressed thereby to enable the maximum pore size to be extremely small. Therefore, there can be obtained a wear resistant member having an excellent rolling life property and a good durability.

Therefore, when the above wear resistant member is used as rolling bearing material to assemble a bearing device, good sliding/rolling characteristics can be maintained for a long time of operation period, and there can be provided a rotation machine having excellent operational reliability and durability.

What is claimed is:

1. A rolling bearing member comprising a silicon nitride sintered body comprising 1–10 mass % of rare earth element in terms of oxide thereof as sintering agent, wherein a total oxygen content of said silicon nitride sintered body is 6 mass % or less, a porosity of said silicon nitride sintered body is 0.5 vol. % or less, and a maximum size of pore existing in grain boundary phase of the silicon nitride sintered body is 0.3 μm or less.

2. The rolling bearing member according to claim 1, wherein said silicon nitride sintered body has a three point bending strength of 900 MPa or more and a fracture toughness of 6.5 MPa·m$^{1/2}$ or more, and a rolling life defined as a rotation number of steel balls rolling along a circular track formed on the rolling bearing member formed of said silicon nitride sintered body until a surface of said silicon nitride rolling bearing member peels off is $1 \times 10^8$ or more, when said rolling life is measured in such a manner that a circular track having a diameter of 40 mm is set on the rolling bearing member, three rolling balls each having a diameter of 9.525 mm and composed of SUJ2 are provided on said circular track, and the rolling balls are rotated on the track at a rotation speed of 1200 rpm under a condition of being applied with a pressing load of 400 Kg.

3. The rolling bearing member according to claim 1, wherein said silicon nitride sintered body has a crash strength of 200 MPa or more and a fracture toughness of 6.5 MPa·m$^{1/2}$ or more, and a rolling fatigue life defined as a time until a surface of rolling balls composed of said silicon nitride rolling bearing member rolling along a circular track formed on a steel plate peels off is 400 hours or more, when said rolling fatigue life is measured in such a manner that three rolling balls each having a diameter of 9.525 mm are formed from said silicon nitride rolling bearing member, said three rolling balls are provided on the circular track having a diameter of 40 mm set on the steel plate formed of SUJ2, and the rolling balls are rotated at a rotation speed of 1200 rpm on the track under a condition of being applied with a pressing load so as to impart a maximum contact stress of 5.9 GPa to the balls.

4. The rolling bearing member according to any one of claim 1 to 3, wherein said silicon nitride sintered body comprises at most 5 mass % of at least one of aluminum and magnesium in terms of the amount of oxide thereof.

5. The rolling bearing member according to claim 1, wherein said silicon nitride sintered body comprises at most 5 mass % of aluminum nitride.

6. The rolling bearing member according to claim 1, wherein said silicon nitride sintered body comprises at most 5 mass % of at least one element selected from the group consisting of Ti, Hf, Zr, W, Mo, Ta, Nb and Cr in terms of oxide thereof.

7. The rolling bearing member according to claim 1, wherein said silicon nitride sintered body comprises an outer peripheral portion having an oxygen content lower than that of a center portion, and a difference of the oxygen contents between the outer peripheral portion and the center portion is within a range of 0.2–2 mass %.

8. The rolling bearing member according to claim 1, wherein said silicon nitride sintered body has a Vickers' hardness of 1200 or more.

9. The rolling bearing member according to claim 7, wherein said rare earth element comprises a metal, and a difference in content of the metal contained in sintering agent in the outer peripheral portion and the center portion is 0.2 mass % or less.

10. The rolling bearing member according to claim 7, wherein said silicon nitride sintered body comprises an intermediate portion of which oxygen content is at most 1 mass % lower than that of the center portion.

11. The rolling bearing member according to claim 7, wherein said rolling bearing member comprising the silicon nitride sintered body is a bearing ball.

12. The rolling bearing member according to claim 11, wherein said bearing ball has a diameter of 9 mm or more.

13. A method of manufacturing a rolling bearing member according to claim 1, comprising:

preparing a material mixture by adding 1 to 10 mass % of a rare earth element in terms of the amount of an oxide thereof to a silicon nitride powder containing at most 1.5 mass % of oxygen and 75–97 mass % of α-phase type silicon nitride and having an average grain size of 1.0 μm or less;

molding said material mixture to form a compact;

degreasing said compact;

heating and holding said compact at a temperature of 1,250–1,600° C. for a predetermined period of time on the way to a sintering step; and conducting a main sintering for the compact at a temperature of 1,650–1,850° C. thereby to form a rolling bearing member composed of silicon nitride sintered body.

14. The method claim 13, wherein said method further comprises moderately cooling the sintered body at a cooling rate of at most 100° C. per hour until the sintering temperature is reduced to a point at which a liquid phase formed by the rare earth element during the sintering step solidifies.

15. The method of claim 13, wherein at most 5 mass % of at least one of aluminum and magnesium in terms of the amount of oxide thereof is added to said silicon nitride powder.

16. The method of claim 13, wherein at most 5 mass % of aluminum nitride is added to said silicon nitride powder.

17. The method of claim 13, wherein at most 5 mass % of at least one element selected from the group consisting of Ti, Hf, Zr, W, Mo, Ta, Nb and Cr in terms of oxide is added to said silicon nitride powder.

18. The method of claim 13, wherein said method further comprises conducting a hot isostatic pressing treatment (HIP) on said silicon nitride sintered body in a non-oxidizing atmosphere of 300 atm or more at a temperature of 1,600–1,850° C. after completion of the sintering step.

* * * * *